United States Patent
Shalom et al.

(10) Patent No.: US 11,943,316 B1
(45) Date of Patent: Mar. 26, 2024

(54) DATABASE CONNECTION MULTIPLEXING FOR PREPARED STATEMENTS

(71) Applicant: Amazon Technologies, Inc., Seattle, WA (US)

(72) Inventors: Yoni Shalom, Vancouver (CA); Negar Koochakzadeh, North Vancouver (CA); Prateek Sahu, Langley (CA)

(*) Notice: Subject to any disclaimer, the term of this patent is extended or adjusted under 35 U.S.C. 154(b) by 0 days.

(21) Appl. No.: 18/073,889

(22) Filed: Dec. 2, 2022

(51) Int. Cl.
  *H04L 67/5682* (2022.01)
  *G06F 16/25* (2019.01)

(52) U.S. Cl.
  CPC ........ *H04L 67/5682* (2022.05); *G06F 16/252* (2019.01)

(58) Field of Classification Search
  CPC ........................... H04L 67/5682; G06F 16/252
  See application file for complete search history.

(56) References Cited

U.S. PATENT DOCUMENTS

| | | | | |
|---|---|---|---|---|
| 7,784,033 | B2* | 8/2010 | Srivastava | G06F 11/3476 714/45 |
| 8,719,242 | B2* | 5/2014 | Theobald | G06F 16/24524 707/705 |
| 8,874,609 | B1* | 10/2014 | Singh | G06F 16/2453 707/770 |
| 9,558,207 | B1* | 1/2017 | McAlister | G06F 16/1727 |
| 11,442,928 | B2* | 9/2022 | Biswas | G06F 16/2379 |
| 11,461,322 | B1* | 10/2022 | Plenderleith | G06F 16/2456 |
| 2005/0015356 | A1* | 1/2005 | Ireland | G06F 16/252 |
| 2005/0050039 | A1* | 3/2005 | Theobald | G06F 16/24524 |
| 2009/0172094 | A1* | 7/2009 | Srivastava | G06F 9/5061 709/203 |
| 2012/0084315 | A1* | 4/2012 | Schneider | G06F 16/24558 707/769 |
| 2018/0039678 | A1* | 2/2018 | de Lavarene | G06F 16/24552 |
| 2020/0327140 | A1* | 10/2020 | Khillar | G06F 16/2282 |
| 2021/0133183 | A1* | 5/2021 | Biswas | H04L 67/101 |
| 2022/0292096 | A1* | 9/2022 | Zhang | H04L 67/146 |

FOREIGN PATENT DOCUMENTS

| | | | | |
|---|---|---|---|---|
| WO | WO-2011103784 A1 * | 9/2011 | | H04L 45/00 |
| WO | WO-2012091948 A2 * | 7/2012 | | C12N 5/0693 |
| WO | WO-2021050306 A1 * | 3/2021 | | G06F 12/0831 |

* cited by examiner

*Primary Examiner* — Oanh Duong
(74) *Attorney, Agent, or Firm* — Lee & Hayes, P.C.

(57) ABSTRACT

Systems and techniques are disclosed for multiplexing database connections with a database proxy, in association with prepared statements. When a client sends initial messages, via a client connection, that set up a prepared statement with a database, the database proxy stores corresponding prepared statement setup data in state data associated with the client connection. When the client sends subsequent messages via the client connection that invoke the prepared statement, the database proxy selects a database connection to use to forward the subsequent messages to the database. The database proxy uses the stored prepared statement setup data to select a database connection that the database already associates with the prepared statement, or to inject prepared statement setup messages that cause the database to set up the prepared statement with the selected database connection.

20 Claims, 9 Drawing Sheets

DATABASE CONNECTION MULTIPLEXING FOR PREPARED STATEMENTS

BACKGROUND

Clients, such as computing resources and/or applications, may interact with databases. For example, a client may store data in a database. A client can also submit a query to a database to retrieve data, for instance to display the retrieved data or perform other operations based on the retrieved data.

In some examples, clients can interact with databases indirectly via intermediate database proxies. A database proxy may establish a set of database connections with a database. When a client submits a database query to the database proxy, the database proxy can select one of the established database connections that is not currently being used, and can use the selected database connection to forward the database query to the database. The database proxy can also use the selected database connection to receive corresponding data retrieved from the database in response to the database query, and can forward the retrieved data to the client. The database proxy may later re-use that database connection in association with a different client. Accordingly, because clients can access a database indirectly via a database proxy that can re-use database connections for different clients, the database can avoid using resources to set up and/or maintain direct connections with each individual client.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
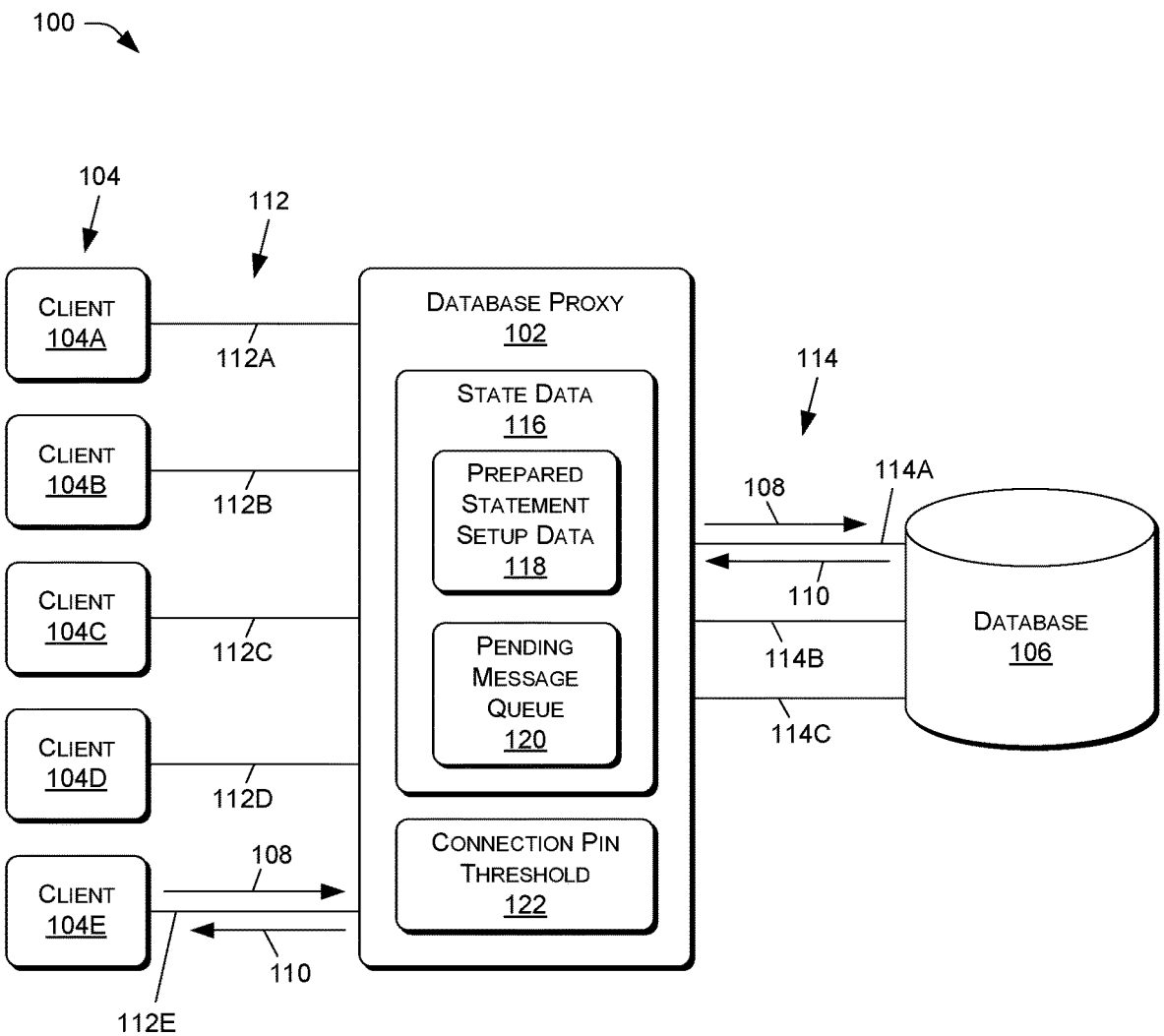
FIG. 1 shows an example of system in which a database proxy can connect clients to a database and perform multiplexing in association with prepared statements.

A database proxy can connect clients, such as computing resources and/or applications, to a database. For example, instead of connecting to the database directly, clients can connect to the database proxy. The database proxy can have one or more direct connections to the database, such that the database proxy can route data to and/or from the database in association with different clients that connect to the database proxy.

Accordingly, the database proxy can have a set of client connections to different clients, and also have a set of database connections to the database. In some examples or situations, the database proxy may "pin" a client connection, associated with a client, to a database connection. In such examples or situations, there can be a 1 to 1 mapping between the client connection and the database connection, such that the database proxy always uses the database connection pinned to the client connection to send and/or receive data associated with the client.

In other examples or situations, the database proxy can provide multiplexing services that allow the same database connection to be re-used in association with different clients and client connections. For example, when a first client attempts to perform a first database transaction via the database proxy, the database proxy may temporarily associate the first client with a particular database connection until the first database transaction is complete. After the first database transaction is complete, the database proxy can disassociate the first client from the particular database connection. Accordingly, if a second client later attempts to perform a second database transaction via the database proxy, the database proxy may re-use the particular database connection by temporarily associating the second client with the particular database connection until the second database transaction is complete.

Because the multiplexing provided by the database proxy can allow a set of database connections to be re-used in association with different clients and client connections, fewer computing resources associated with the database can be used to set up and maintain those database connections, relative to establishing direct database connections for each individual client that interacts with the database. Multiplexing can also be more efficient than having exclusive database connections for each individual client. For instance, while individual clients may only sporadically interact with the database, such that exclusive database connections associated with the individual clients may be left unused relatively often, multiplexing can allow the database proxy to re-use database connections with different clients when those clients do interact with the database. In some cases, a service provider that owns or operates the database proxy and/or the database may charge clients less for multiplexed access to the database because database connections can be reused, and may charge clients more for pinned connections that exclusively reserve database connections for those clients but that may increase usage of computing resources associated with the database.

Although multiplexing database connections can be more efficient and cost-effective than pinning database connections in many situations, some existing database proxies are unable to multiplex database connections in association with certain types of database interactions. For example, many database proxies are unable to multiplex database connections when clients use prepared statements to interact with a database.

A client can be configured to set up a prepared statement with a database. The prepared statement may be a database query or other database command, such as a Structured Query Language (SQL) command. After the client sets up the prepared statement with the database, the client can then re-use the prepared statement multiple times to interact with the database, without setting up an entire new query or other command for each individual database interaction. For example, a prepared statement may be a SQL statement that includes one or more variables. After the prepared statement is set up with the database, the client may repeatedly re-use the prepared statement by providing the database with different values for the variables of the prepared statement, instead of generating and formatting entire new SQL statements based on different variable values for each individual database interaction. Re-using prepared statements can thus be more efficient for clients than repeatedly generating full database commands, and may thus reduce time and usage of processor cycles, memory, and/or other computing resources associated with database interactions.

However, because prepared statements are set up with the database by clients, the database can associate prepared statements with the database connections that were used to set up the prepared statements. This can cause conflicts or errors if database connections are re-used though multiplexing via a database proxy as described above.

For example, a database proxy may temporarily associate a client with a first database connection during a first database transaction. During the first database transaction, the client may set up a prepared statement that the database associates with the first database connection. At a later point in time, in association with a second database transaction, the database proxy may temporarily associate the same client with a different second database connection. Accordingly, if the client attempts to re-use the prepared statement during the second database transaction, the database may return an error in some cases because the prepared statement had been set up in association with the first database connection instead of the second database connection the database proxy is using for the client during the second database transaction. In other cases, if the database associates the second database connection with a different prepared statement that had been set up by a different client, and the client attempts to invoke the prepared statement it had set up during the first database transaction in association with the first database connection, the database may return unexpected or undesired data to the client according to the different prepared statement that the database associates with the second database connection.

Due to the possibility of such conflicts and errors, many existing database proxies do not allow multiplexing of connections when clients use prepared statements. For example, if a client attempts to set up a prepared statement with a database, such that the database associates the prepared statement with a particular database connection, some database proxies are configured to pin the client to that particular database connection. By pinning the client to the particular database connection in this situation, the database proxy can ensure that any attempts by the client to re-use the prepared statement are passed to the database via the same database connection that the database associates with the prepared statement. However, as discussed above, pinning the client to a particular database connection that becomes reserved exclusively for the client can be an inefficient use of database resources, and/or can be more costly for the client.

Other database proxies handle multiplexing with prepared statements by refreshing database connections each time a database connection is used for a database transaction associated with a client. By refreshing the database connections, any previous prepared statements associated with those database connections that might otherwise lead to conflicts or errors can be cleared by the database. However, because such database proxies refresh the database connections when the database connections are re-used, the clients may have to set up prepared statements again for each database transaction. For example, the database proxies may inform clients that any prepared statements set up by the clients will not be preserved, and that the clients can be coded to set up prepared statements anew for each database transaction. However, having to set up prepared statements anew for each database transaction can be inefficient and defeat the purpose of prepared statements, which as discussed above are generally used by clients to efficiently re-use prepared statements over time after the prepared statements have been set up.

However, described herein is a database proxy that can multiplex database connections when clients use prepared statements to interact with a database. The database proxy can store state data associated with clients. When a client attempts to set up a prepared statement with the database, the database proxy can save corresponding prepared statement setup data in the state data. If the client later attempts to re-use the prepared statement, when the database proxy may be using a different database connection in association with the client, the database proxy can send the prepared statement setup data saved in the state data to the database. The prepared statement setup data provided by the database proxy can cause the database to set up the prepared statement in association with the current database connection being used by the database proxy in association with the client. The database proxy can also pass any additional information, such as variable values, provided by the client in association with the attempt to re-use the prepared statement to the database, such that the database can respond based on the prepared statement.

Accordingly, although multiplexing can cause a client's attempt to re-use a prepared statement to be transmitted via a different database connection than the database proxy previously used for the client, the database proxy can used stored prepared statement setup data to set up the prepared statement again with the database in association with the current database connection being used for the client. This process may be transparent to the client itself, such that the client can send setup data associated with a prepared statement once, and then later re-use the prepared statement even if the database proxy is multiplexing database connections and data associated with the client may pass to the database via different database connections at different times.

The systems and methods associated with the database proxy described herein may be implemented in a number of ways. Example implementations are provided below with reference to the following figures.

FIG. 1 shows an example 100 of system in which a database proxy 102 can connect clients 104 to a database 106 and perform multiplexing in association with prepared statements. The clients 104, such as clients 104A-104E shown in FIG. 1, can be configured to interact with the database 106. For example, the clients 104 can be configured to engage in database transactions, such as transactions to store data in the database 106, edit data in the database 106, retrieve data from the database 106, and/or otherwise interact with the database 106.

In some examples, the clients 104 can be servers, computers, virtual machines, hosts, nodes, and/or other computing resources. In other examples, the clients 104 can be software applications, such as web applications, mobile applications, or software applications executing on one or more computing resources. Different clients 104 may, in some examples, be different instances of the same application that are executing via different hosts or other computing resources.

As discussed above, the clients 104 can be configured to interact with the database 106. For example, during a database transaction, a client can send one or more messages 108 to the database 106, and the database 106 can return one or more corresponding responses 110 to the client. In some examples the messages 108 can be, or include, SQL statements that request data from the database 106, add data to the database 106, edit data in the database 106, delete data in the database 106, and/or otherwise interact with the database 106. The responses 110 from the database 106 can include data retrieved from the database 106 in response to corresponding messages 108, confirmations of operations performed by the database 106 in response to corresponding messages 108, error messages associated with requested operations that could not be performed by the database 106, and/or any other types of responses from the database 106.

The database proxy 102 can be configured to connect individual clients 104 to the database 106 via client connections 112 between the clients 104 and the database proxy 102, and via database connections 114 between the database proxy 102 and the database 106. For example, the database proxy 102 can receive messages 108 from clients 104 via client connections 112, and can forward the messages 108 to the database 106 via database connections 114. The database proxy 102 can similarly receive responses 110 from the database 106 via database connections 114, and can forward the responses 110 to the corresponding clients 104 via client connections 112. In some situations, the database proxy 102 may also generate messages 108 that the database proxy 102 sends to the database 106 via database connections 114, and may receive corresponding responses 110 from the database 106 via the database connections 114.

The database proxy 102 and/or the database 106 can execute via one or more servers, virtual machines, or other computing resources. In some examples, the database proxy 102 and/or the database 106 can execute via computing resources of a service provider network, a cloud computing environment, or other type of computing environment.

In some examples, the database proxy 102 can expose one or more application programming interfaces (APIs) or other interfaces that clients 104 can use to establish corresponding client connections 112 with the database proxy 102, such as client connections 112A-112E shown in FIG. 1. The database proxy 102 can also establish a set of database connections 114 between the database proxy 102 and the database 106, such as database connections 114A-114C shown in FIG. 1. Accordingly, a client can interact with the database 106 via one of the client connections 112 that connects the client to the database proxy 102, and via one of the database connections 114 that connects the database proxy 102 to the database 106.

The number of client connections 112 between clients 104 and the database proxy 102 may differ from the number of database connections 114 between the database proxy 102 and the database 106. For example, while there may be N client connections 112, there may be M database connections 114. In some examples, there may be fewer database connections 114 than client connections 112.

In some situations, the database proxy 102 may pin a particular database connection with a particular client connection, in order to create a 1 to 1 mapping between the particular client connection and the particular database connection. A database connection that is pinned by the database proxy 102 to a client connection can become reserved for exclusive use with that client connection, and the database proxy 102 can serve as a passthrough between the client connection and the pinned database connection. Accordingly, in these situations, the database proxy 102 may be configured to always use a particular pinned database connection to communicate with the database 106 in association with a corresponding client connection, at least until the client connection is terminated or is unpinned from the particular database connection. As an example, the database proxy 102 may pin client connection 112A, associated with client 104A, with database connection 114C. The database proxy 102 may thus serve as a passthrough for messages 108 and responses 110 that the client 104A and the database 106 exchange via the client connection 112A and the pinned database connection 114C.

However, the database proxy 102 can also multiplex database connections 114, such that the database proxy 102 can use different database connections 114 at different times in association with different client connections 112. For example, if a client attempts to engage in a database transaction with the database 106 via a client connection that is not pinned to a particular database connection, the database proxy 102 can select any of the database connections 114 that are not in current use and that are not already associated with other client connections 112. The database proxy 102 can temporarily associate the client connection with the selected database connection during the database transaction, but may disassociate the client connection from the selected database connection upon completion of the database transaction. Accordingly, the database proxy 102 may later re-use the same database connection in association with a different client connection, for example by temporarily associating a different client connection with the same database connection during a different database transaction. Over time, the database proxy 102 can use multiplexing to associate the same database connection with different client connections 112.

As an example, if client 104E uses client connection 112E to send a database query to the database proxy 102, the database proxy 102 may determine that database connection 114A is currently available to be used with client connection 112E. For instance, the database proxy 102 may determine that database connection 114A is currently available because database connection 114A is not currently pinned to any client connection, and because database connection 114A is not currently temporarily associated with any client connection. Accordingly, the database proxy 102 may at least temporarily associate client connection 112E with database connection 114A, and can use database connection 114A to send the database query on to the database 106. If the database 106 sends a response to the database query to the database proxy 102 via database connection 114A, the database proxy 102 can send the response to client 104E via client connection 112E. After the interaction between client 104E and the database 106 is complete, the database proxy 102 can disassociate database connection 114A from client connection 112E, such that database connection 114A again becomes available for use with any of the client connections 112. For instance, if client 104D later attempts to interact with the database 106 via client connection 112D, the database proxy 102 may re-use database connection 114A by temporarily associating database connection 114A with client connection 112D during interactions between client 104D and the database 106.

The database proxy 102 can maintain state data 116 associated with client connections 112 and/or database connections 114. The state data 116 can be used to track authentication data, session variables, temporary tables, metadata, and/or other attributes associated with the client connections 112 and/or database connections 114. The state data 116 can also track information about prepared statements used by clients 104, as discussed further below. The database proxy 102 can use the state data 116 during multiplexing of database connections 114, for instance to determine which database connections 114 the database proxy 102 can use in connection with which client connections 112.

As an example, the state data 116 can indicate that a particular client connection is associated with UTF-8 character encoding. When the database proxy 102 receives a message for the database 106 via that particular client connection, the database proxy 102 can use the state data 116 to determine which available database connections 114 have also been set up to use UTF-8 character encoding. The database proxy 102 can select one of the database connections 114 associated with UTF-8 character encoding and use the selected database connection to forward the message to the database 106, in order to avoid errors that may occur if the message were instead forwarded via a different database connection that uses a different type of character encoding.

As another example, the state data 116 can indicate that one or more client connections 112 have been authenticated with a particular username, and can also indicate that one or more database connections 114 have been authenticated with that particular username. Accordingly, when a message for the database 106 arrives via one of the client connections 112 that the state data 116 indicates have been authenticated with a username, the database proxy 102 can use the state data 116 to select one of the database connections 114 have also been authenticated with the same username. The database proxy 102 can use the selected database connection to forward the message to the database 106, in order to avoid authentication errors that may occur if the message were instead forwarded via a different database connection that was not authenticated with the username.

In some situations, clients 104 may use prepared statements during interactions with the database 106. If clients 104 set up prepared statements, the database proxy 102 can store corresponding prepared statement (PS) setup data 118 in the state data 116, in association with the corresponding client connections 112 and/or database connections 114. The database proxy 102 can use the state data 116 associated with the prepared statements during multiplexing of database connections 114, for instance to ensure that prepared statements associated with client connections 112 can be used via corresponding database connections 114 selected by the database proxy 102.

Prepared statements can be associated with database queries or other database commands, such as SQL commands, that clients 104 can use to interact with the database 106 during database transactions. A client can set up a prepared statement in order to re-use the prepared statement one or more times during similar database transactions, without generating and formatting a new database query or command for each of the individual database transactions.

As an example, prepared statements can be set up and used via the PostgreSQL extended query protocol or similar protocols, in which execution of SQL commands can be divided into multiple steps. Such steps can be associated with various types of messages 108, such as Parse messages, Bind messages, Describe messages, Execute messages, Sync messages, and/or other types of messages.

A Parse message can define a prepared statement, and can be processed by the database 106 to set up the prepared statement. As described further below, the database 106 can set up the prepared statement in association with the database connection by which the database 106 receives the Parse message.

The Parse message can include a textual string for an SQL statement. The textual string may, in some examples, include variable placeholders for values that can be provided as arguments in later separate messages. As an example, a Parse message can include a textual string for an SQL statement such as "SELECT*FROM my_table WHERE some_var=?" in which "?" is a variable placeholder. In this example, the SQL statement in the Parse message can be configured to retrieve, from a table in the database 106 named "my_table," all records that have a "some_var" field with a value that can be provided in a later message (as denoted by the "?" variable placeholder). In some examples, the Parse message can also provide a name for the prepared statement.

After the database 106 has set up a prepared statement based on a Parse message as described above, a client can use a Describe message to retrieve information about the prepared statement. For example, a Describe message can specify a name of an existing prepared statement to retrieve information about variable placeholders associated with the prepared statement, types and/or formats of data that can be returned by the prepared statement, and/or other information about the prepared statement.

Additionally, after the database 106 has set up a prepared statement based on a Parse message as described above, a client can send a Bind message that readies the prepared statement for execution. The Bind message can identify the name of the prepared statement, and can include arguments providing values for corresponding variable placeholders, if any, in the prepared statement. Accordingly, rather than setting up an entire new SQL statement, the client can use a Bind message to call an existing prepared statement and, in some cases, provide arguments with values for the variable placeholders of the prepared statement. The client can also send an Execute message after the Bind message, which can cause the database 106 to execute the prepared statement, for instance by filling in variable placeholders of the SQL statement with values provided in the Bind message and executing the filled-in SQL statement.

For instance, if a client has already sent a Parse message to set up a prepared statement that includes the example "SELECT*FROM my_table WHERE some_var=?" SQL statement described above, at a first time the client may send a first Bind message with an argument of "75," followed by a first Execute message. The first Bind message and the first Execute message can thus cause the database 106 to execute, based on the prepared statement set up earlier via the Parse message, a first query of "SELECT*FROM my_table WHERE some_var=75." At a later second time, the client may send a second Bind message with an argument of "300," followed by a second Execute message. The second Bind message and the second Execute message can thus cause the database 106 to execute, based on the prepared statement set up earlier via the Parse message, a second query of "SELECT*FROM my_table WHERE some_var=300." In this example, the client can avoid generating and sending distinct full SQL statements such as "SELECT*FROM my_table WHERE some_var=75" and "SELECT*FROM my_table WHERE some_var=300" at different times. The client can instead set up the prepared statement once, and then use later Bind and Execute messages that provide values for variable placeholders and that cause the database to execute corresponding queries.

In some examples, a block of messages 108 can be used to set up or invoke a prepared statement. The block of messages may conclude with a Sync message, and the database 106 may be configured to wait until a Sync message is received to execute one or more messages 108 that precede the Sync message.

For example, a prepared statement may initially be set up for later execution via a block of PS setup messages, such as a Parse message followed by a Sync message. As another example, a prepared statement can be set up and executed via a block of PS setup messages that includes a Parse message, a Bind message, an Execute message, and a Sync message. As yet another example, to use an existing prepared statement that was set up earlier, a client may send a block of PS invocation messages that reference the existing prepared statement. For example, a block of PS invocation messages can include a Bind message, an Execute message, and a Sync message.

When the database proxy 102 is configured to multiplex database connections 114, and a particular client connection is not pinned to a particular database connection, the database proxy 102 can select an available database connection to route messages 108 received from a client to the database 106. The database proxy 102 may, at different times, use different database connections 114 to send messages 108 associated with the same prepared statement and/or the same client connection to the database 106. However, as discussed above, the database 106 can associate particular prepared statements with particular database connections 114.

Accordingly, the database proxy 102 can use PS setup data 118 to avoid routing messages 108 from clients 104, which reference previously-set-up prepared statements, over database connections 114 that the database 106 does not associate with those prepared statements. For example, during multiplexing of database connections 114, the database proxy 102 can use the PS setup data 118 to select database connections 114 that the database 106 already associates with prepared statements that are referenced in messages 108 received from clients 104, and/or to cause the database 106 to set up the prepared statements again in association with database connections 114 selected by the database proxy 102.

When a client sends PS setup messages to set up a prepared statement, such as a block of messages 108 that includes a Parse message, the database proxy 102 can store corresponding PS setup data 118 in state data 116 associated with the client connection by which the messages 108 were received from the client. In some examples, the PS setup data 118 can be a copy of one or more of the PS setup messages received from the client, such as a Parse message. In other examples, the database proxy 102 can derive one or more types of PS setup data 118 from the PS setup messages received from the client, such as a name for the prepared statement, a textual string of a query or command associated with the prepared statement, data types of arguments associated with variable placeholders in the textual string, and/or any other data about the setup of the prepared statement that is included in or derived from the PS setup messages sent by the client.

The database proxy 102 can also select a database connection to temporarily associate with the client connection by which the PS setup messages were received from the client, and can use the selected database connection to forward the PS setup messages to the database 106. In some examples, the database proxy 102 may store the corresponding PS setup data 118 in the state data 116 prior to forwarding the PS setup messages to the database 106. In these examples, if the database 106 returns one or more error responses 110 indicating that the database 106 could not successfully process the PS setup messages or set up the prepared statement, the database proxy 102 can roll back the state data 116 to a prior state that existed before the PS setup messages were forwarded to the database 106. For instance, the database proxy 102 can roll back the state data 116 by clearing the PS setup data 118 associated with the prepared statement from the state data 116. In other examples, the database proxy 102 may store the PS setup data 118 in the state data 116 after forwarding the PS setup messages to the database 106 via the selected database connection, and after the database proxy 102 receives corresponding responses 110 from the database 106 confirming that the database 106 successfully set up the prepared statement in response to the PS setup messages.

As described above, the database proxy 102 can store PS setup data 118 in state data 116 associated with a client connection through which PS setup messages setting up a prepared statement were received from a client. However, in some examples the database proxy 102 can also, or alternately, store the same or similar PS setup data 118 in state data 116 associated with a selected database connection used to forward such PS setup messages to the database 106, such that the database proxy 102 can use the PS setup data 118 in the state data 116 to track which prepared statements the database 106 has associated with which database connections 114.

In some examples, the database proxy 102 can select database connections 114 to associate with client connections 112 based at least in part on the PS setup data 118, so that PS invocation messages referencing previously-set-up prepared statements are routed via database connections 114 that the database 106 already associates with those prepared statements or compatible prepared statements. Accordingly, by using the PS setup data 118 to select database connections 114, the PS invocation messages can be processed successfully by the database 106 without the clients 104 and/or the database 106 setting up the prepared statements again.

As an example, if a block of PS invocation messages received by the database proxy 102 from client 104E via client connection 112E begins with a Bind message that references a prepared statement, the database proxy 102 may use PS setup data 118 associated with client connection 112E to identify one or more attributes of the prepared statement. For instance, the database proxy 102 can use the PS setup data 118 to identify a name of the prepared statement, a textual query string associated with the prepared statement, and/or variable placeholders or corresponding data types associated with the prepared statement. The database proxy 102 can also use PS setup data 118 associated with the database connections 114 to determine that the database 106 already associates database connection 114A with the prepared statement named in the Bind message, or a compatible prepared statement that may have a different name but that has the same textual query string and variable placeholders. In this example, the database 106 may associate database connection 114A with the prepared statement due to one or more previous PS setup messages, such as a previous Parse message, sent by client 104E or a different client to set up the prepared statement.

Accordingly, in this example, the database proxy 102 can use the PS setup data 118 to select database connection 114A for a current database transaction associated with client connection 112E. The database proxy 102 can send the block of PS invocation messages, which references the prepared statement, to the database 106 via database connection 114A. Because database 106 already associates database connection 114A with the prepared statement named in the block of messages 108, or a compatible prepared statement, the database 106 can process the block of PS invocation messages from client 104E even if the database proxy 102 has previously associated client connection 112E with other database connections 114 during previous database transactions.

In other examples or situations, the database proxy 102 can use PS setup data 118 to cause the database 106 to set up a prepared statement in association with a database connection that the database proxy 102 has selected to be at least temporarily associated with a client connection. For example, as discussed in more detail below with respect to FIG. 2, if clients 104 use client connections 112 to send PS invocation messages that reference previously-set-up prepared statements, the database proxy 102 can use corresponding PS setup data 118 to generate "injected" PS setup messages that correspond with the previously-set-up prepared statements. The injected PS setup messages can, for example, include Parse messages that cause the database 106 to set up the prepared statements referenced by the PS invocation messages. Such Parse messages can be copies of Parse messages stored in the PS setup data 118, or can be new Parse messages generated by the database proxy 102 based on the PS setup data 118.

The database proxy 102 can send the injected PS setup messages over selected database connections 114 that the database proxy 102 at least temporarily associates with the client connections 112. The injected PS setup messages can cause the database 106 to set up the prepared statements in association with the selected database connections 114 currently being used by the database proxy 102 in association with the client connections 112. Following the injected setup messages, the database proxy 102 can also forward the PS invocation messages that reference the prepared statements via the selected database connections 114. Accordingly, by using the PS setup data 118 to send injected PS setup messages that cause the database 106 to set up the prepared statements in association with the database connections 114 selected by the database proxy 102 during multiplexing, the database 106 can process PS invocation messages sent via those database connections 114 without the clients 104 setting up the prepared statements again.

As a first example, the database proxy 102 can track PS setup data 118 in association with database connections 114 as discussed above. However, if the database proxy 102 receives PS invocation messages from client 104C via client connection 112C that reference a prepared statement previously set up by client 104C, the database proxy 102 may determine that zero database connections 114 are available that the database 106 already associates with that prepared statement. The database proxy 102 can instead select another available database connection, such as database connection 114B, to associate with client connection 112C. The database proxy 102 can use the PS setup data 118 associated with client connection 112C to send injected PS setup messages that cause the database 106 to set up the prepared statement in association with database connection 114B. Accordingly, although the database 106 did not previously associate database connection 114B with the prepared statement, the injected PS setup messages can cause the database 106 to set up the prepared statement in association with database connection 114B so that the database 106 can process the PS invocation messages sent by client 104C that the database proxy 102 forwards via selected database connection 114B.

As a second example, the database proxy 102 may not be configured to track PS setup data 118 in association with database connections 114, but may track PS setup data 118 in association with client connections 112. In this example, if the database proxy 102 receives PS invocation messages from client 104B via client connection 112B that reference a prepared statement previously set up by client 104B, the database proxy 102 may select an available database connection, such as database connection 114C, to associate with client connection 112B. The database proxy 102 can use the PS setup data 118 associated with client connection 112B to send injected PS setup messages that cause the database 106 to set up the prepared statement in association with database connection 114C. Accordingly, although the database 106 may not have previously associated database connection 114C with the prepared statement, the injected PS setup messages can cause the database 106 to set up the prepared statement in association with database connection 114C so that the database 106 can process the PS invocation messages sent by client 104B that the database proxy 102 forwards via selected database connection 114C.

In some examples, injected PS setup messages sent by the database proxy 102 to cause the database 106 to set up a prepared statement in association with particular database connection can include, or be sent after, "flush" instructions or other instructions that cause the database 106 to refresh the database connection and/or clear any previously-existing prepared statements associated with the database connection. By refreshing the database connection and/or clearing any previously-existing prepared statements, potential conflicts between the prepared statement set up via the injected PS setup messages and any such previously-existing prepared statements can be avoided. In other examples, flush instructions may be sent separably and/or at other times by the database proxy 102, for instance when the database proxy 102 initially determines to use a particular database connection in association with a client connection.

The database proxy 102 can use PS setup data 118 to send injected PS setup messages, and cause the database 106 to set up corresponding prepared statements in association with currently-selected database connections 114, without notifying the clients 104. Setting up of prepared statements in association with different database connections 114 at different times can thus be transparent to the clients 104. Accordingly, from the perspective of the clients 104, the clients 104 can send initial PS setup messages to set up prepared statements, and can later send corresponding PS invocation messages that reference those prepared statements regardless of whether or not the database proxy 102 forwards those messages to the database via the same or different database connections 114.

As shown in FIG. 1, the state data 116 can include or be associated with a pending message queue 120. The pending message queue 120 can be associated with a pairing of a client connection and a database connection used in association with the setup and/or use of a prepared statement during a database transaction as described herein. The pending message queue 120 can store information associated with messages 108 that set up and/or reference prepared statements.

For example, as described further below with respect to FIG. 3, the database proxy 102 can add messages 108 to the pending message queue 120 when the messages 108 are sent or forwarded to the database 106. The database proxy 102 can also remove messages 108 from the message queue 120 when corresponding responses 110, such as confirmations or errors, are returned by the database 106. Accordingly, the database proxy 102 can use the pending message queue 120 to track messages 108 that have been sent to the database 106 by the database proxy 102 in association with a database transaction, and for which the database proxy 102 has not yet received corresponding responses 110 from the database 106.

The messages 108 tracked in the pending message queue 120 can include messages 108 that have been received from a client via a client connection, and that have been forwarded by the database proxy 102 to the database 106 via a database connection that the database proxy 102 temporarily associates with the client connection. For instance, messages 108 added to the pending message queue 120 can be PS setup messages or PS invocation messages received from the client via the client connection, and that database proxy 102 has forwarded to the database 106 via the database connection. The database proxy 102 can remove such messages 108 from the pending message queue 120 when the database 106 returns corresponding responses 110 to the messages 108, and the database proxy 102 can forward the responses 110 to the client.

The messages 108 tracked in the pending message queue 120 can also include injected messages 108 that were not received from the client via the client connection, but that were sent by the database proxy 102 to the database 106. For instance, messages 108 added to the pending message queue 120 can be injected PS setup messages that have been generated by the database proxy 102 based on PS setup data 118, and that have been sent by the database proxy 102 to the database 106 via the database connection. The database proxy 102 can remove such injected messages 108 from the pending message queue 120 when the database 106 returns corresponding responses 110, and the database proxy 102 may be configured to refrain from forwarding such responses 110 to injected messages 108 to the client via the client connection.

As an example, if the database proxy 102 sends a Parse message to the database 106 via a database connection, for example based on forwarded PS setup messages or as part of injected PS setup messages, the database proxy 102 can add the Parse message to the pending message queue 120. At a later point in time, in some examples after one or more subsequent messages 108 have been sent to the database 106, the database proxy 102 can receive a response to the Parse message from the database 106. If the response is a confirmation or success message, such as a "ParseComplete" message indicating that the database 106 successfully processed the Parse message, the database proxy 102 can remove the Parse message from the pending message queue 120 to signify that the database proxy 102 is no longer waiting for a response to the Parse message.

In some examples, if the database 106 returns an error indicating that a particular message could not be processed, the database proxy 102 can update the pending message queue 120 accordingly. For example, the pending message queue 120 may indicate that the database proxy 102 has sent a block of messages 108 including a Bind message and an Execute message to the database 106. However, the database 106 may return an error response, such as an "ErrorResponse" message, indicating that the Bind message could not be processed. The database 106 may be configured to not process any subsequent messages, in a block of messages, that follow a message the database 106 is unable to process. The error response indicating that the Bind message could not be processed can therefore also indicate that the database 106 has not processed, and will not process, the subsequent Execute message. Accordingly, based on the error response to the Bind message, the database proxy 102 can remove both the Bind message and the subsequent Execute message from the pending message queue 120.

In other examples, if the database 106 returns an error indicating that a particular message could not be processed, the database proxy 102 can use the pending message queue 120 to roll back to an earlier state of the state data 116. For example, the pending message queue 120 may indicate that the database proxy 102 has sent a Parse message to the database 106, such as a Parse message in PS setup messages received from the client or in injected PS setup messages sent by the database proxy 102 based on PS setup data 118. However, the database 106 may return an error response, such as an "ErrorResponse" message, indicating that the Parse message could not be processed. Based on the error response, the database proxy 102 can roll back the state data 116 and revert to a prior state that existed before the database proxy 102 sent or forwarded the Parse message to the database 106. For instance, if the Parse message was a new PS setup message received from the client that defined a new prepared statement, the database proxy 102 may have stored new corresponding PS setup data 118 associated with the new prepared statement in the state data 116. However, based on the error indicating that the database 106 was unable to process the Parse message or set up the new prepared statement, the database proxy 102 can delete or otherwise clear the added PS setup data 118 associated with the new prepared statement from the state data 116. The database proxy 102 can also remove the Parse message, and any subsequent messages that the database 106 may not process due to the error associated with the Parse message, from the pending message queue 120.

In some examples, the database proxy 102 may be configured with a connection pin threshold 122 associated with a size of the state data 116 associated with prepared statements. As a non-limiting example, the connection pin threshold 122 can be set to 10 MB. If the size of the state data 116 associated with prepared statements exceeds the connection pin threshold 122, the database proxy 102 can pin client connections 112 to database connections 114, in order to reduce the size of the state data 116 or inhibit additional growth of the size of the state data 116.

For example, a client may send PS setup messages or PS invocation messages to the database proxy 102 via a client connection that is not already pinned to a database connection. However, if the current size of the state data 116 associated with prepared statements exceeds the connection pin threshold 122, the database proxy 102 can pin the client connection to an available database connection, such that the database connection is taken out of a pool of database connections 114 that can be multiplexed. When the client connection is pinned to the database connection, the database proxy 102 can serve as a passthrough for corresponding messages 108 and responses 110 exchanged between a client and the database via the client connection and the database connection, and the database proxy 102 can avoid storing and maintaining state data 116 associated with the pairing of the client connection and the database connection that might otherwise be used during multiplexing as described herein.

In some examples, when the database proxy 102 pins a client connection to a database connection, the database proxy 102 may use previously-stored PS setup data 118 to send injected PS setup messages that prepare the pinned database connection to be used with one or more prepared statements that the client previously set up. The database proxy 102 may then remove the previously-stored PS setup data 118 from the state data 116. For example, a client may send PS invocation messages to use a previously-set-up prepared statement as part of a new database transaction while the size of the state data 116 associated with prepared statements exceeds the connection pin threshold 122. In this example, the database proxy 102 may use PS setup data 118 already stored in the state data 116 to send injected PS setup messages that cause the database 106 to set up the prepared statement in association with a selected database connection that will be pinned to the client connection associated with the client. Accordingly, because the injected PS setup messages can cause the database 106 to set up the prepared statement in association with the pinned database connection, the database proxy 102 can pin the client connection to the selected database connection and can remove the PS setup data 118 associated with the client connection from the state data 116.

In some examples, if the size of the state data 116 associated with prepared statements reaches a lower threshold, such as 60% or any other percentage of the connection pin threshold 122, the database proxy 102 may send warnings to clients 104 indicating that due to memory limits the database proxy 102 may begin pinning client connections 112 that use prepared statements to database connections 114 instead of multiplexing database connections 114. Accordingly, if such clients 104 are configured with modes or alternate features that can avoid use of prepared statements, such clients 104 may respond to such warnings by activating such modes or alternate features in order to avoid sending the database proxy 102 PS setup messages or PS invocation messages that may result in pinning of the client connections 112 associated with the clients 104 to database connections 114.

Overall, although the database 106 can associate prepared statements with particular corresponding database connections 114, and the database proxy 102 may cause client connections 112 to be associated with different database connections 114 at different times, the database proxy 102 can use PS setup data 118 to ensure that prepared statements can be used and re-used by clients 104 regardless of which database connections 114 the database proxy 102 selects to use in association with the client connections 112. The operations of the database proxy 102 associated with the storage and/or use of the PS setup data 118 can be transparent to the clients 104, such that the clients 104 can set up, use, and re-use prepared statements without having information indicating which database connections 114 the database proxy 102 selects to use in association with the client connections 112 at different times. For instance, in some examples the database proxy 102 can use PS setup data 118 to select a database connection that is already associated with a prepared statement that a client is attempting to use via PS invocation messages. As another example, when the database proxy 102 selects a database connection to use to route PS invocation messages from a client to the database 106, the database proxy 102 can use PS setup data 118 to send injected PS setup messages that cause the database 106 to set up the prepared statement referenced by the PS invocation messages in association with the selected database connection, such that the database 106 can successfully process the PS invocation messages as described further below with respect to FIG. 2.

Figure 2:
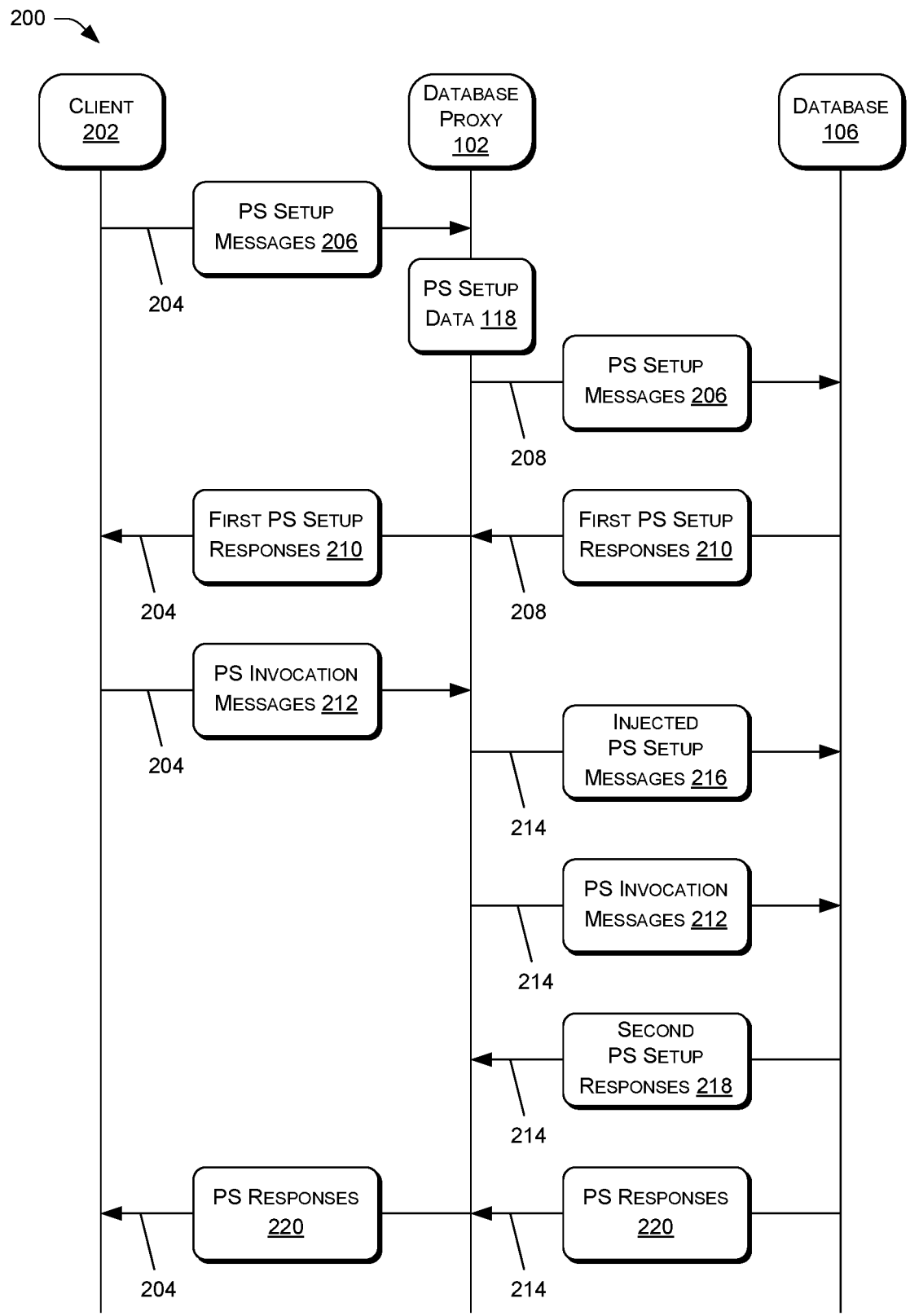
FIG. 2 shows a sequence diagram associated with an example in which the database proxy can, based on stored prepared statement setup data, use different database connections during different database transactions that are associated with the same client and the same prepared statement.

FIG. 2 shows a sequence diagram 200 associated with an example in which the database proxy 102 can, based on stored PS setup data 118, use different database connections 114 during different database transactions that are associated with the same client 202 and the same prepared statement. As shown in FIG. 2, the client 202 can connect to the database proxy 102 via a client connection 204.

The client 202 can send one or more PS setup messages 206 associated with a new prepared statement to the database proxy 102 via the client connection 204. For example, the PS setup messages 206 can include a Parse message with a textual string for a database query associated with the prepared statement. The textual query may, in some examples, include one or more variable placeholders. The Parse message can also provide a name for the prepared statement, and/or other attributes associated with setup of the prepared statement. In some examples, the PS setup messages 206 may also include other messages 108 associated with an initial setup and/or execution of the prepared statement, such as a Bind message, a Describe message, an Execute message, and/or a Sync message.

The database proxy 102 may be configured to multiplex database connections 114, and as such may not have pinned client connection 204 to any individual database connection. Accordingly, the database proxy 102 can select an available database connection to temporarily associate with client connection 204 during a database transaction initiated via the PS setup messages 206. For example, as shown in FIG. 2, the database proxy 102 can determine to temporarily associate a first database connection 208 with client connection 204.

Because the database proxy 102 is multiplexing database connections 114, and may later at least temporarily associate client connection 204 with another database connection that is different from the first database connection 208, the database proxy 102 can store PS setup data 118 based on the PS setup messages 206. The database proxy 102 can store the PS setup data 118 in state data 116 associated with the client connection 204. As described further below, the database proxy 102 can later use the PS setup data 118 to set up the corresponding prepared statement with the database 106 again in association with the same or a different database connection.

In some examples, the PS setup data 118 can include copies of one or more PS setup messages 206 received from client 202 via the client connection 204. In other examples, the database proxy 102 can derive one or more types of PS setup data 118 from the one or more PS setup messages 206 received from client 202 via client connection 204, such as a name for the prepared statement, a textual string of a query or command associated with the prepared statement, data types of arguments associated with variable placeholders in the textual string, and/or any other data about the setup of the prepared statement that is included in or derived from the one or more PS setup messages 206.

In addition to storing the PS setup data 118 based on the PS setup messages 206, the database proxy 102 can use the selected first database connection 208 to forward the PS setup messages 206 to the database 106. The database proxy 102 can store the PS setup data 118 in the state data 116 associated with client connection 204 before or after forwarding the PS setup messages 206 to the database 106 via the first database connection 208.

In response to the PS setup messages 206, the database 106 can also return one or more corresponding first PS setup responses 210 to the database proxy 102 via the first database connection 208. The first PS setup responses 210 can, for example, include a "ParseComplete" message indicating that the database 106 successfully processed the Parse message in the PS setup messages 206 and set up the prepared statement. The first PS setup responses 210 can also, for example, include a "BindComplete" message indicating that the database 106 successfully processed a Bind message in the PS setup messages 206, data retrieved from the database 106 via an execution of the prepared statement in response to a Bind message and an Execution message in the PS setup messages 206, a "CommandComplete" message indicating that execution of command associated with the prepared statement is complete, and/or a "ReadyForQuery" message indicating that the database 106 has completed processing of the PS setup messages 206. The database proxy 102 can forward the first PS setup responses 210 to the client 202 via client connection 204.

Receipt of the first PS setup responses 210, for example including a "ReadyForQuery" message, can indicate a conclusion of the database transaction initiated by the client 202 via the PS setup messages 206. Because the database proxy 102 only temporarily associated the first database connection 208 with client connection 204 during the database transaction, the database proxy 102 can disassociate the first database connection 208 from the client connection 204 based on receipt of the first PS setup responses 210 from the database 106.

In some examples, the database proxy 102 may wait to store the PS setup data 118 in the state data 116 until first PS setup responses 210 confirming that the database 106 has set up the corresponding prepared statement have been received from the database 106. However, in other examples, the database proxy 102 can add the PS setup data 118 to the state data 116 in association with forwarding the PS setup messages 206 as described above. If the first PS setup responses 210 include an error message indicating that the database 106 did not successfully set up the prepared statement, the database proxy 102 can roll back the state data 116 to an earlier state before the PS setup messages 206 were forwarded to the database 106, for instance by deleting the PS setup data 118 from the state data 116.

If the first PS setup responses 210 indicated that the database 106 was able to set up the prepared statement in response to the PS setup messages 206, the database proxy 102 can continue to store the PS setup data 118 in state data 116 associated with client connection 204. The database proxy 102 may later receive one or more PS invocation messages 212 from client 202 via client connection 204. Because the client 202 can have received the first PS setup responses 210 in response to the PS setup messages 206, the information received by the client 202 can indicate, to the client 202, that the database 106 has set up the prepared statement and the prepared statement can be used by the client 202. Accordingly, the one or more PS invocation messages 212 can reference or invoke that prepared statement. As an example, the PS invocation messages 212 can include a Bind message that attempts to ready the prepared statement for execution, for instance by providing values for variable placeholders of the prepared statement. The PS invocation messages 212 can also include an Execute message and a Sync message that can cause the database 106 to execute the prepared statement based on the Bind message. As another example, the PS invocation messages 212 can include a Describe message that requests information about the prepared statement, followed by a Sync message.

Because database proxy 102 is multiplexing database connections 114, the database proxy 102 can select an available database connection to temporarily associate with the client connection 204 during the database transaction being initiated by the PS invocation messages 212. For instance, if the first database connection 208 used earlier in association with client connection 204 associated with a different client connection at the time the database proxy 102 receives the PS invocation messages 212 from client 202 via client connection 204, the database proxy 102 may instead temporarily associate client connection 204 with a different database connection. Accordingly, as shown in FIG. 2, the database proxy 102 may determine to temporarily associate client connection 204 with a second database connection 214 (instead of the first database connection 208) during the database transaction being initiated by the PS invocation messages 212.

Although database proxy 102 may temporarily associate client connection 204 with the second database connection 214 in response to receiving the PS invocation messages 212, the prepared statement referenced by the PS invocation messages 212 can have been set up earlier by the database 106 in association with the first database connection 208. Accordingly, because the database 106 may not yet associate the prepared statement referenced by the PS invocation messages 212 with the second database connection 214, the database proxy 102 can send injected PS setup messages 216 based on the PS setup data 118 to cause the database 106 to set up the prepared statement referenced by the PS invocation messages 212 in association with the second database connection 214.

For example, when the database proxy 102 receives one or more PS invocation messages 212 from the client 202 via the client connection 204, the database proxy 102 can identify stored PS setup data 118 that is associated with client connection 204 and that is associated with the prepared statement referenced by the PS invocation messages 212. The database proxy 102 can use the stored PS setup data 118 to send the injected PS setup messages 216 to the database 106 via the second database connection 214. The injected PS setup messages 216 can include at least some messages 108 that are similar to, or identical to, one or more messages 108 included in the PS setup messages 206 that caused the database 106 to set up the prepared statement for use with the first database connection 208. For example, the injected PS setup messages 216 can include a Parse message that defines the name of the prepared statement, a textual string for a database query associated with the prepared statement, including one or more variable placeholders in some examples, and/or other attributes associated with setup of the prepared statement.

In addition to sending the injected PS setup messages 216 based on the PS setup data 118, the database proxy 102 can also forward the PS invocation messages 212, received from client 202 via client connection 204, to the database 106 via the second database connection 214. In some examples, the database proxy 102 may send the injected PS setup messages 216 and the PS invocation messages together, for instance in a block of messages that includes the injected PS setup messages 216, followed by the PS invocation messages 212, followed by a concluding Sync message.

In some examples, the database proxy 102 can also send instructions to the database 106 to flush and/or refresh the second database connection 214 by removing any previous prepared statements that the database 106 associates with the second database connection 214. The database proxy 102 can send such flush instructions to the database 106 upon selection of the second database connection 214 in response to receipt of the PS invocation messages 212 from the client 202, and/or prior to the injected PS setup messages 216 sent to the database 106. For example, the database proxy 102 may send flush instructions to the database 106 as an initial block of messages before a block of messages that includes injected PS setup messages 216 and the PS invocation messages, or as part of a block of messages that includes the flush instructions, followed by the injected PS setup messages 216, followed by the PS invocation messages 212.

When the database proxy 102 sends the injected PS setup messages 216 and forwards the PS invocation messages 212 to the database 106 via the second database connection 214, the database proxy 102 can also receive one or more corresponding responses 110 from the database 106 via the second database connection 214. For example, the database 106 can return second PS setup responses 218 associated with the injected PS setup messages 216, and PS responses 220 associated with the forwarded PS invocation messages 212. The second PS setup responses 218 can, for example, include a "ParseComplete" message indicating that the database 106 successfully processed the Parse message in the injected PS setup messages 216 and set up the prepared statement. As another example, if the PS invocation messages 212 included a Bind message and an Execute message, the PS responses 220 can include a "BindComplete" message indicating that the database 106 successfully processed the Bind message, data retrieved from the database 106 via an execution of the prepared statement in response to the Bind message and the Execution message, and/or a "CommandComplete." The messages 108 returned by the database 106 can also include a "ReadyForQuery" message indicating that the database 106 has completed processing of the injected PS setup messages 216 and the PS invocation messages 212. As shown in FIG. 2, the database proxy 102 can forward the PS responses 220, including a concluding "ReadyForQuery" message, to the client 202 via the client connection 204. However, the database proxy 102 can refrain from forwarding the second PS setup responses 218 to the client 202.

As shown in FIG. 2, the client 202 may have sent PS setup messages 206 via client connection 204 that caused the database 106 to initially set up a prepared statement in association with the first database connection 208. However, although the database proxy 102 may later determine to use the second database connection 214 in association with client connection 204, the injected PS setup messages 216 can nevertheless cause the database 106 to set up the prepared statement in association with the second database connection 214, such that the database 106 can successfully process the later PS invocation messages 212 routed by the database proxy 102 via the second database connection 214 instead of the first database connection 208.

The operations of the database proxy 102 associated with sending the injected PS setup messages 216 and receiving the corresponding second PS setup responses 218 can be transparent to the client 202. For example, although the client 202 can receive the PS responses 220 provided by the database 106 in response to the PS invocation messages 212 sent by the client 202, the database proxy 102 can avoid informing the client 202 about the injected PS setup messages 216. The database proxy 102 can also avoid forwarding the second PS setup responses 218, returned by the database 106 to the database proxy 102 in response to the injected PS setup messages 216, to the client 202.

Accordingly, from the perspective of the client 202, the client 202 can set up a prepared statement and re-use the prepared statement one or more times without concern as to whether the database proxy 102 may route corresponding messages 108 and/or responses 110 via different database connections 114 during each individual database transaction associated with the prepared statement. For example, the client 202 can use the initial PS setup messages 206 to set up the prepared statement with the database 106. The client 202 can then use PS invocation messages 212 to later re-use the prepared statement, without sending a new Parse message or otherwise setting up the prepared statement again with the database 106, even if the database proxy 102 determines to use a different database connection to route the PS invocation messages 212 to the database 106.

Figure 3:
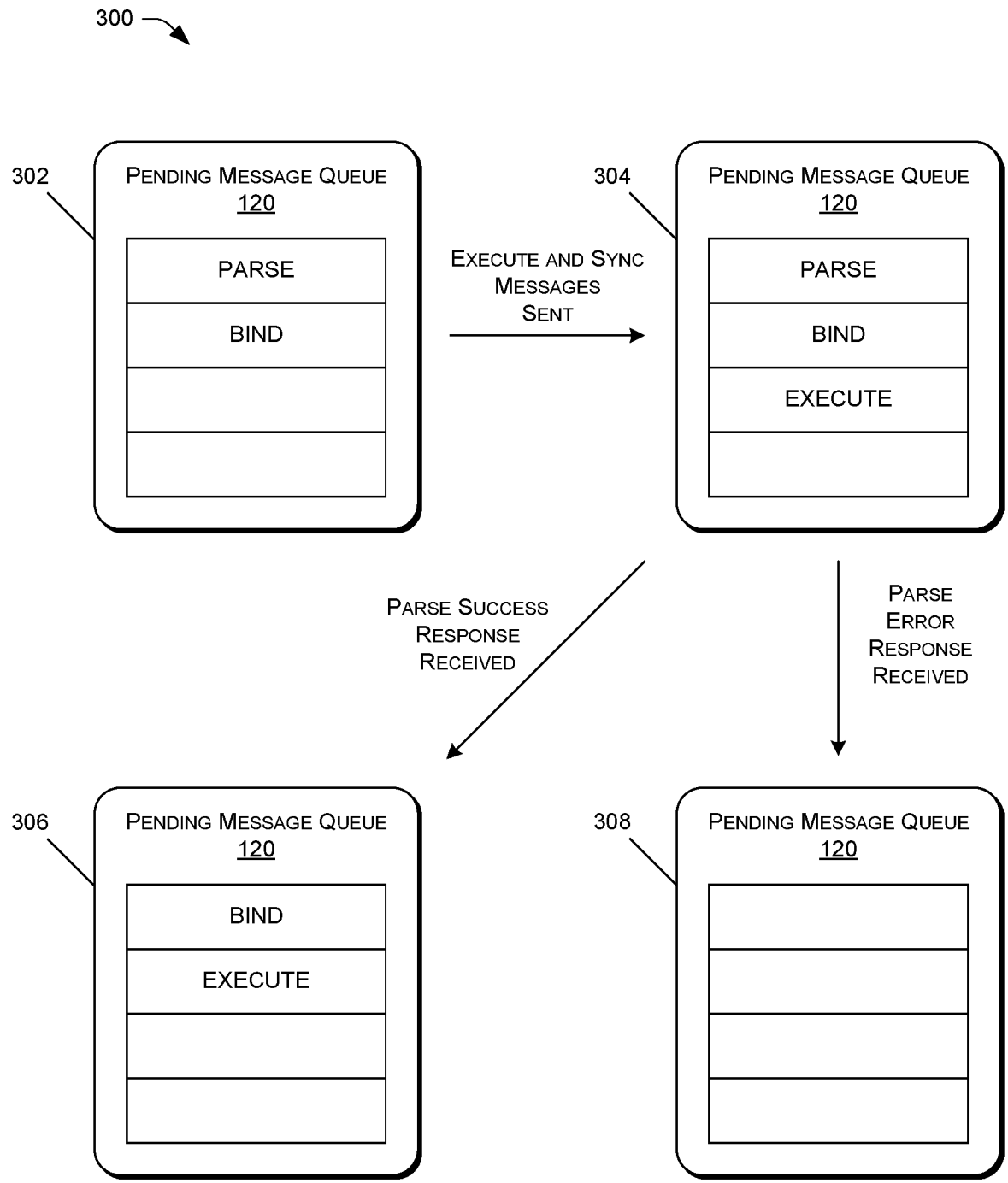
FIG. 3 shows an example of changes to a pending message queue over a period of time.

FIG. 3 shows an example 300 of changes to the pending message queue 120 over a period of time. As discussed above, the state data 116 can include a pending message queue 120 associated with messages 108 that set up and/or reference prepared statements. The pending message queue 120 can be associated with a pairing of a client connection and a database connection used in association with the setup and/or use of a prepared statement during a database transaction. The database proxy 102 can use the pending message queue 120 to track messages 108 that have been sent to the database 106 by the database proxy 102 in association with the database transaction, and for which the database proxy 102 has not yet received corresponding responses 110 from the database 106.

At state 302, the pending message queue 120 can indicate that the database proxy 102 has sent a Parse message and a Bind message to the database 106. After the database proxy 102 sends a subsequent Execute message and a Sync message to the database 106, the database proxy 102 can add the Execute message to the end of the pending message queue 120 as shown in FIG. 3 in association with state 304.

In some examples after state 304, the database proxy 102 may receive a successful response to the Parse message, such as "ParseComplete," indicating that the database 106 successfully processed the Parse message and set up the prepared statement in association with the database connection. Accordingly, based on receiving the response to the Parse message, the database proxy 102 can update the pending message queue 120 to state 306 by removing the Parse message from the front of the pending message queue 120.

In some situations, after a successful response to the Parse message, the database proxy 102 may receive subsequent responses 110 to the Bind and/or Execute messages that cause the database proxy 102 to also remove the Bind and Execute messages from the pending message queue 120. As a first example, the database proxy 102 may receive subsequent responses 110 indicating that the database 106 successfully processed the Bind and Execute messages, which can cause the database proxy 102 to remove the corresponding Bind and Execute messages from the front of the pending message queue 120. As a second example, the database proxy 102 may receive an error response, such as an "ErrorResponse" message, indicating that the database 106 could not process the Bind message. The database proxy 102 can respond to such an error message by removing the Bind message and the Execute message from the pending message queue 120. As discussed above, the database 106 may be configured to not process any subsequent messages, in a block of messages, that follow a message the database 106 is unable to process. Accordingly, the error response associated with the Bind message can also indicate that the database 106 has not processed, and will not process, the Execute message that was already sent by the database proxy 102. Accordingly, based on the error response associated with the Bind message, the database proxy 102 can remove the Bind message as well as the subsequent Execute message from the pending message queue 120.

In other examples after state 304, the database proxy 102 may receive an error response to the Parse message, such as "ErrorResponse," indicating that the database 106 did not successfully process the Parse message and has not set up the prepared statement in association with the database connection. In these examples, the error response to the Parse message can indicate that the database 106 has not processed, and will not process, the Parse message, the Bind message, and the Execute message that was already sent by the database proxy 102. Accordingly, the database proxy 102 can remove the Parse message, the Bind message, and the Execute message from the pending message queue 120 at state 308.

In addition to, or in association with, removing the Parse message, the Bind message, and the Execute message from the pending message queue 120, the database proxy 102 can also roll back the state data 116 associated with the prepared statement to an earlier state prior to when the Parse message was sent to the database 106 and when the Parse message was added to the pending message queue 120. For instance, if the Parse message was a message from the client that defined a new prepared statement, and that was forwarded by the database proxy 102 to the database 106, the database proxy 102 may have stored new corresponding PS setup data 118 associated with the new prepared statement in the state data 116. However, based on the error indicating that the database 106 was unable to process the Parse message or set up the new prepared statement, the database proxy 102 can delete or otherwise clear the added PS setup data 118 associated with the new prepared statement from the state data 116, and thus roll back the state data 116 along with removing the Parse message and subsequent Bind message and Execute message from the pending message queue 120.

Figure 4:
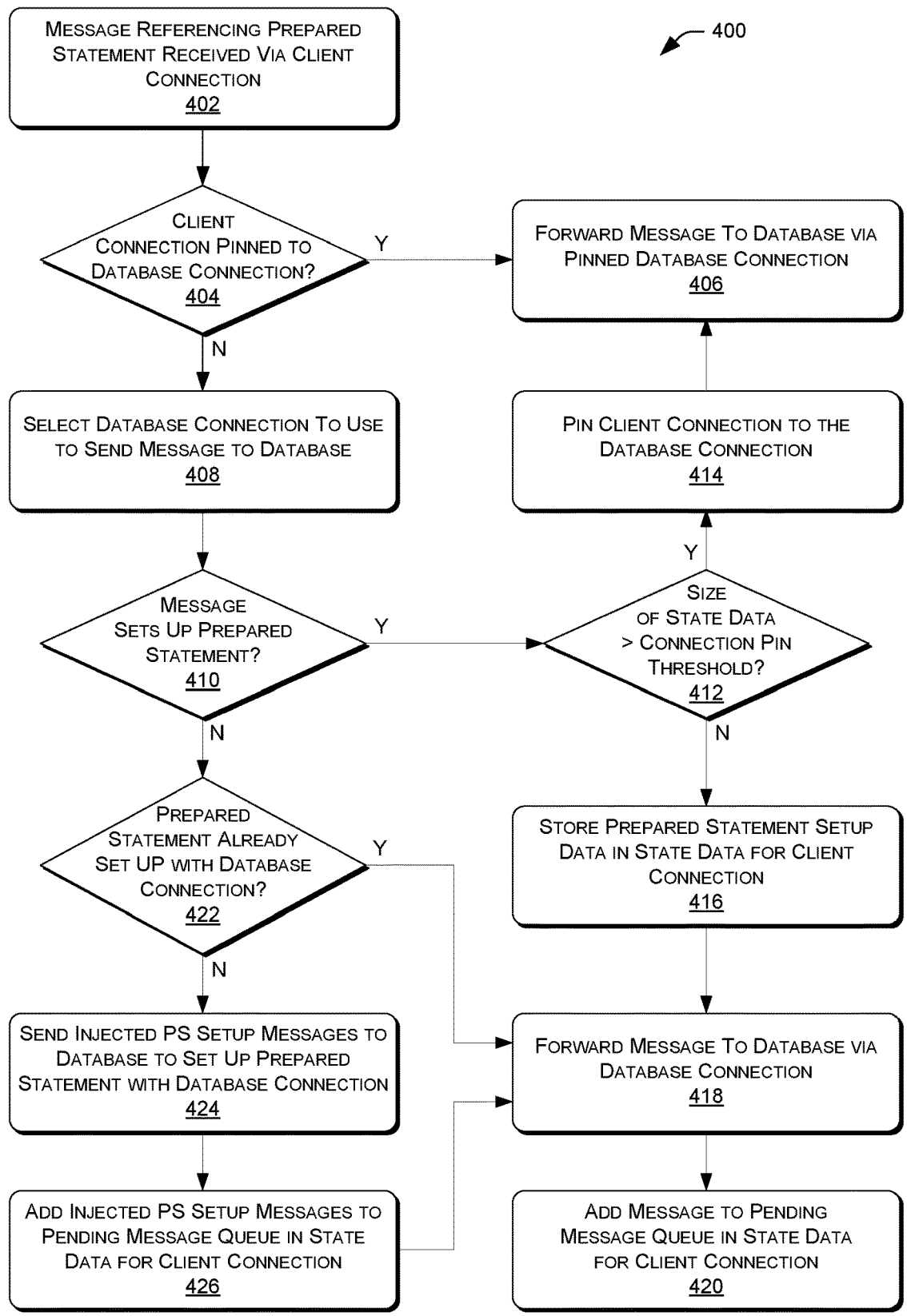
FIG. 4 is a flow diagram of an illustrative process by which the database proxy can perform multiplexing of database connections in association with prepared statements.

FIG. 4 is a flow diagram of an illustrative process 400 by which the database proxy 102 can perform multiplexing of database connections 114 in association with prepared statements. Process 400 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

At block 402, the database proxy 102 can receive a message from a client via a client connection. The message can reference a prepared statement associated with a database transaction. In some examples, the message received at block 402 can be a PS setup message that sets up the prepared statement. In other examples, the message received at block 402 can be a PS invocation message that references a previously-set-up prepared statement.

At block 404, the database proxy 102 can determine whether the client connection is pinned to a particular database connection. If the client connection is pinned to a particular database connection (Block 404-Yes), the database proxy 102 can serve as a passthrough and the database proxy 102 can forward the message to the database 106 via the pinned database connection at block 406. In some examples, if the client connection is pinned to a particular database connection, but the database proxy 102 has not yet used PS setup data 118 associated with a prepared statement to send injected PS setup messages that cause the database 106 to set up the prepared statement in association with the particular database connection, the database proxy 102 can send such injected PS setup messages ahead of the message forwarded at block 406, such that the database 106 can set up the prepared statement and thus be able to successfully process the message forwarded at block 406.

However, if the client connection is not pinned to a particular database connection (Block 404-No), at block 408 the database proxy 102 can select a database connection to use to send the message to the database 106 during the database transaction. If the client connection is not yet associated by the database proxy 102 with a database connection for the database transaction, for instance if the message is at the beginning of a block of messages 108 associated with the database transaction, at block 408 the database proxy 102 can select an available database connection to at least temporarily associate with the client connection during the database transaction. The database proxy 102 can also, in some examples, send instructions to the database 106 to flush and/or refresh the selected database connection by removing any previous prepared statements that the database 106 associates with the selected database connection. If the client connection is already associated by the database proxy 102 with a database connection for the database transaction, for instance if the message is not at the beginning of a block of messages 108 associated with the database transaction and the database proxy 102 has already selected a database connection based on an earlier message in the block of messages 108, at block 408 the database proxy 102 can select that database connection.

At block 410, the database proxy 102 can determine whether the message is a PS setup message, such as a Parse message, that sets up a new prepared statement. In some examples, if the message is a PS setup message that sets up a new prepared statement (Block 410-Yes), the database proxy 102 may use previously-stored PS setup data 118 to send injected PS setup messages that cause the database 106 to set up a corresponding prepared statement in association with the selected database connection. For instance, if the message is a Parse message that sets up a prepared statement in association with a particular name, but the client previously sent an earlier Parse message to set up a prepared statement with that same name, the injected PS setup messages can cause the database 106 to set up the earlier prepared statement with the name so that the new Parse message returns an error or other response as may be expected based on a second Parse message that references the same name.

Additionally, if the message is a PS setup message that sets up a new prepared statement (Block 410-Yes), the database proxy 102 can determine at block 412 whether the size of the state data 116 associated with prepared statements maintained by the database proxy 102 is currently exceeding the connection pin threshold 122. If the size of the state data 116 associated with prepared statements is exceeding the connection pin threshold 122 (Block 412-Yes), at block 414 the database proxy 102 can pin the client connection to the database connection selected at block 408, and at block 406 the database proxy 102 can forward the message to the database 106 via the pinned database connection. By pinning the client connection to the database connection at block 414, the database proxy 102 can avoid storing state data 116 associated with the client connection.

However, if the size of the state data 116 associated with prepared statements is not currently exceeding the connection pin threshold 122 (Block 412-No), the database proxy 102 can instead store PS setup data 118 in the state data 116 in association with the client connection at block 416, based on the message. For example, if the message is a Parse message, the database proxy 102 can save the Parse message, and/or elements in or derived from the Parse message, in the PS setup data 118. At block 418, the database proxy 102 can also forward the message to the database 106 via the database connection selected at block 408. At block 420, the database proxy 102 can add the message to the pending message queue 120 in the state data 116 in association with the client connection. As discussed below with respect to FIG. 5, the database proxy 102 can later remove the message from the pending message queue 120 based on a corresponding response received from the database 106.

Returning to block 410, the database proxy 102 may determine that the message is not a PS setup message, such as a Parse message, that sets up a new prepared statement. If the message is not a PS setup message that sets up a new prepared statement (Block 410-No), the database proxy 102 can determine whether the message references a prepared statement that has already been set up by the database 106 in association with the selected database connection. As an example, if the message is a Bind message that references a prepared statement set up by a preceding Parse message in a block of messages 108 associated with the same database transaction, the database proxy 102 can determine that the preceding Parse message caused, or will cause, the database 106 to set up the prepared statement referenced by the current Bind message in association with the selected database connection. As another example, the database proxy 102 may have previously used injected PS setup messages during the current database transaction to cause the database 106 to set up the prepared statement referenced by the current message in association with the selected database connection.

Accordingly, if the message references a prepared statement that has already been set up by the database 106 in association with the selected database connection (Block 422-Yes), the database proxy 102 can forward the message to the database 106 via the database connection at block 418. The database proxy 102 can also add the message to the pending message queue 120 in the state data 116 in association with the client connection at block 420.

However, if the message references a prepared statement that has not already been set up by the database 106 in association with the selected database connection (Block 422-No), the database proxy 102 can use PS setup data 118 associated with the prepared statement and the client connection to cause the database 106 to set up the prepared statement in association with the selected database connection. For example, if the message references a prepared statement that was previously set up by the database 106 in association with a different database connection, the database 106 may not currently associate the database connection selected at block 408 with that prepared statement.

Accordingly, at block 424, the database proxy 102 can use the PS setup data 118 to send injected PS setup messages to the database 106 via the database connection selected at block 408. The injected PS setup messages can cause the database 106 to set up the prepared statement in association with the selected database connection. The database proxy 102 can also add the injected PS setup messages to the pending message queue 120 in the state data 116 in association with the client connection at block 426.

After sending the injected PS setup messages at block 424 and adding the injected PS setup messages to the pending message queue 120 at block 426, at block 418 the database proxy 102 can forward the message received via the client connection at block 402 to the database 106 via the database connection. The database proxy 102 can also add the message to the pending message queue 120 in the state data 116 in association with the client connection at block 420. Accordingly, although the message referenced a prepared statement that was not already set up by the database 106 in association with the database connection, the injected PS setup messages sent at block 424 can cause the database 106 to set up the prepared statement in association with the database connection, such that the database 106 can process the message sent later at block 418.

The database proxy 102 can repeat the operations shown in FIG. 4, and/or take different paths through the flow diagram, for subsequent messages 108 received from the client via the client connection. For example, for Parse message that sets up a new prepared statement, the database proxy 102 may store corresponding PS setup data at block 416 and send the Parse message to the database 106 at block 418. However, for a Bind message that follows the Parse message in the same block of messages 108, the database proxy 102 may determine at block 422 that the Bind message references the prepared statement that was set up by the Parse message, and can respond by forwarding the Bind message on to the database 106 via the database connection at block 418. If a subsequent message is instead a Bind message at the beginning of a separate block of messages, and that attempts to use a prepared statement set up by the client via earlier PS setup message, the database proxy 102 may instead determine at block 422 that the Bind message references a prepared statement that the database 106 does not associate with a database connection that is now temporarily being associated with the client connection, and the database proxy 102 can send injected PS setup messages at block 424, before the Bind message forwarded at block 418, to cause the database 106 to set up the prepared statement in association with the client connection so that the database 106 can successfully process the Bind message.

As discussed above with respect to blocks 420 and 426, the database proxy 102 can add messages 108, such as messages received from the client and/or injected PS setup messages, to the pending message queue 120 when the messages 108 are sent or forwarded to the database 106. The database proxy 102 can receive responses 110, such as success confirmations or errors, to such messages 108, and can update the pending message queue 120 accordingly as discussed below with respect to FIG. 5. In some examples, the database proxy 102 can execute the operations of FIG. 4 and FIG. 5 concurrently or in parallel as part of a two-phase tracking system to add messages 108 to the pending message queue 120 when the messages 108 are sent and to remove messages 108 from the pending message queue 120 when corresponding responses 110 are received.

Figure 5:
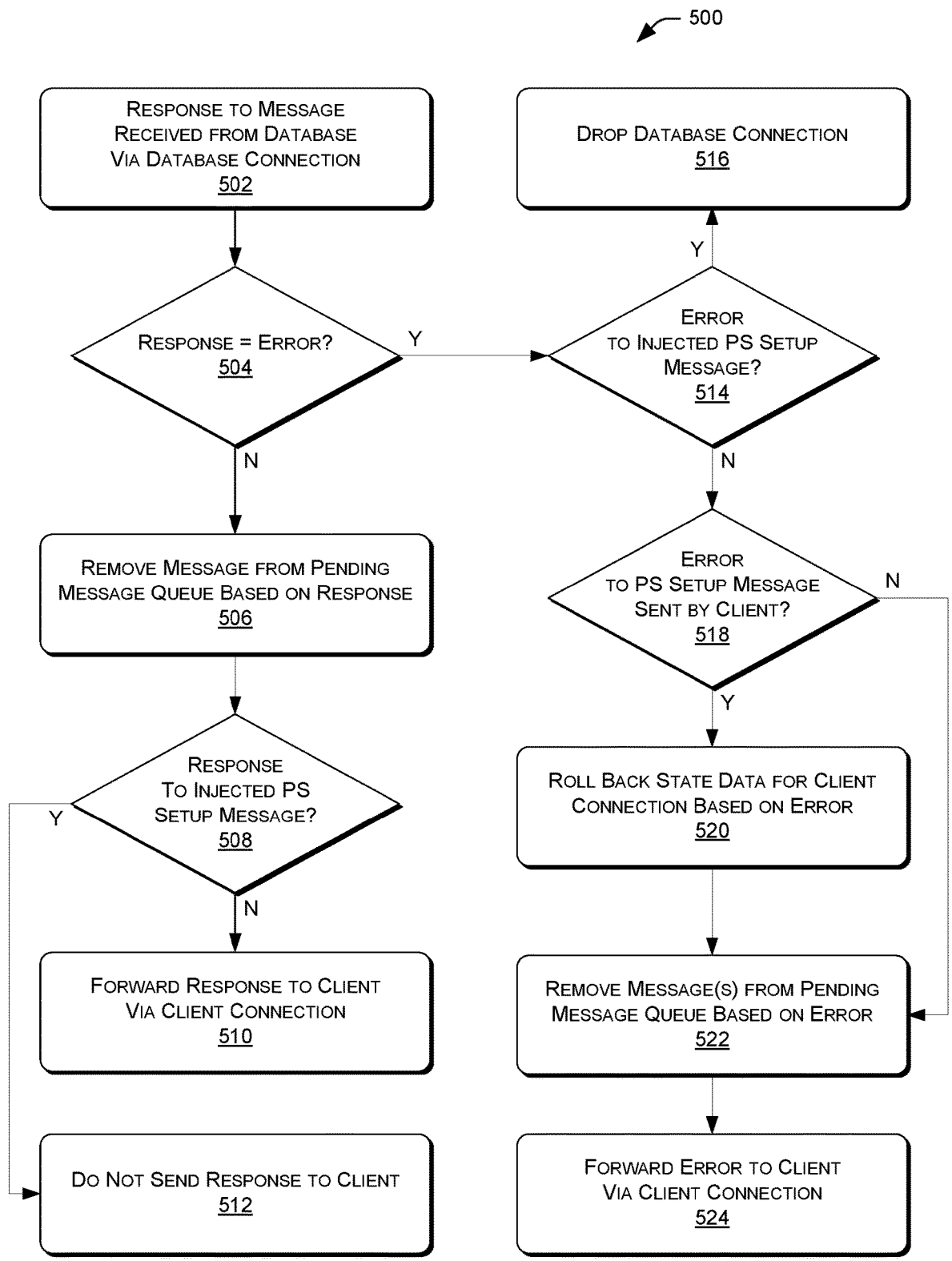
FIG. 5 is a flow diagram of an illustrative process by which the database proxy can process responses received from the database in association with prepared statements.

FIG. 5 is a flow diagram of an illustrative process 500 by which the database proxy 102 can process responses 110 received from the database 106 in association with prepared statements. Process 500 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

At block 502, the database proxy 102 can receive a response from the database 106 via a database connection. The response can be associated with a message, previously sent to the database 106 by the database proxy 102 via the database connection, associated with setup or use of a prepared statement during a database transaction associated with a pairing of the database connection and a client connection. As described above, in some examples the message may have been a PS setup message or a PS invocation message received by the database proxy 102 from a client via the client connection. In other examples, the message may have been an injected PS setup message sent by the database proxy 102 to cause the database 106 to set up the prepared statement in association with the database connection.

At block 504, the database proxy 102 can determine whether the response received at block 502 is an error returned by the database 106. If the response is not an error (Block 504-No), at block 506 the database proxy 102 can remove the corresponding message from the pending message queue 120 in the state data 116 associated with the client connection. For example, if the message was a Parse message in PS setup messages or injected PS setup messages, and the response received at block 502 is a "Parse-Complete" message indicating that the database 106 successfully processed the Parse message and set up the prepared statement in association with the database connection, the database proxy 102 can remove the Parse message from the pending message queue 120. Similarly, if the message was a Bind message in PS invocation messages, and the response received at block 502 is a "BindComplete" message indicating that the database 106 successfully processed the Bind message, the database proxy 102 can remove the Bind message from the pending message queue 120.

At block 508, the database proxy 102 can determine whether the response received at block 502 is a response to an injected PS setup message. If the response is not to an injected PS setup message (Block 508-No), the database proxy 102 can forward the response to the client via the client connection at block 510. For example, if the response is to a Parse message that was sent by the client, or to a Bind message, Execute message, or any other message sent by the client, the database proxy 102 can forward the response to the client via the client connection at block 510. However, if the response is to an injected PS setup message (Block 508-Yes), at block 512 the database proxy 102 can refrain from forwarding the response and thus not send the response to the client. For example, if the response is to a Parse message that was sent by the database proxy 102 in injected PS setup messages, instead of to a Parse message that was sent by the client, the database proxy 102 can determine not to forward the response to the client.

Returning to block 504, the database proxy 102 may instead determine that the response received at block 502 is an error returned by the database 106. If the response is an error (Block 504-Yes), at block 514 the database proxy 102 can determine whether the error is in response to an injected PS setup message sent by the database proxy 102 based on PS setup data 118. In some examples, the database proxy 102 may not maintain PS setup data 118 in the state data 116 unless a Parse message and/or other PS setup messages from the client have been successfully processed by the database 106, such that the database 106 can be expected to successfully process similar injected PS setup messages sent by the database proxy 102 based on such PS setup data 118. Accordingly, an error to an injected PS setup message can be unexpected, and if the database proxy 102 determines that the error is in response to an injected PS setup message (Block 514-Yes), the database proxy 102 can drop the database connection at block 516 and the process can end. In some examples, the database proxy 102 may also roll back the state data 116 in response to the error to the injected PS setup message, for instance by deleting the corresponding PS setup data 118 from the state data 116.

However, if the database proxy 102 determines that the error is not in response to an injected PS setup message (Block 514-No), at block 518 the database proxy 102 can determine whether the error was in response to a PS setup message originally sent by the client. If the error is in response to a PS setup message originally sent by the client (Block 518-Yes), the database proxy 102 can roll back the state data 116 in response to the error to the PS setup message at block 520. For example, while the database proxy 102 may have added PS setup data 118 to the state data 116 when the database proxy 102 received the PS setup message from the client and/or when the database proxy 102 forwarded the PS setup message to the database 106, the database proxy 102 can delete the PS setup data 118 from the state data 116 in response to the error at block 520.

After or in addition to rolling back the state data 116 at block 520, or if the error was not in response to a PS setup message originally sent by the client (Block 518-No), at block 522 the database proxy 102 can remove one or more messages from the pending message queue 120 based on the error. If the pending message queue 120 includes additional messages 108, and the error indicates that responses to those messages 108 will not be coming from the database 106, the database proxy 102 can also remove those additional messages 108 from the pending message queue 120 at block 522. For example, if the error is to a Bind message sent by the client as part of a block of messages that included the Bind message and an Execute message, and the Bind message and the Execute message are both in the pending message queue 120, the error to the Bind message can indicate that the database 106 will not be processing the Execute message that followed the Bind message. Accordingly, the database proxy 102 can remove both the Bind message and the Execute message from the pending message queue 120 in response to the error. Additionally, because the error indicated in the response is not associated with an injected PS setup message, the database proxy 102 can also forward the response including the error to the client via the client connection at block 524.

The database proxy 102 can repeat the operations shown in FIG. 5, and/or take different paths through the flow diagram, for subsequent responses 110 received from the database 106 via the database connection. As discussed above, in some examples the database proxy 102 can execute the operations of FIG. 4 and FIG. 5 concurrently or in parallel as part of a two-phase tracking system to add messages 108 to the pending message queue 120 when the messages 108 are sent, and to remove messages 108 from the pending message queue 120 when corresponding responses 110 are received.

Figure 6:
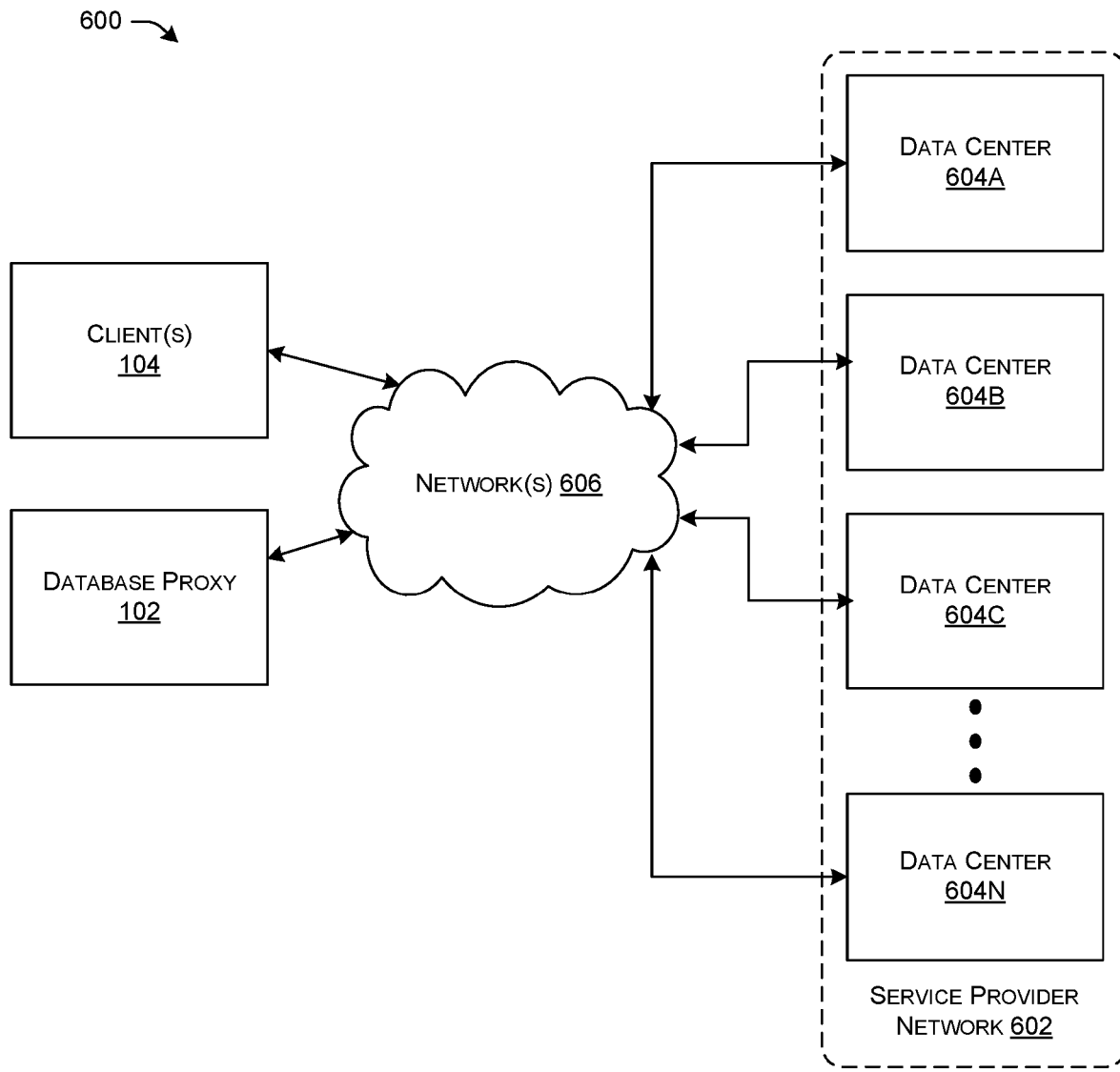
FIG. 6 is a system and network diagram that shows an illustrative operating environment for configurations disclosed herein.

FIG. 6 is a system and network diagram that shows an illustrative operating environment 600 for the configurations disclosed herein, which includes a service provider network 602 that can be configured to perform techniques disclosed herein. In some examples, the service provider network 602 can be an example of a cloud computing environment. Elements of the service provider network 602 can execute various types of computing and network services, such as data storage and data processing, and/or can provide computing resources for various types of systems on a permanent or an as-needed basis. For example, among other types of functionality, the computing resources provided by the service provider network 602 may be utilized to implement various services described above such as, for example, services provided and/or used by the database proxy 102, clients 104, the database 106, and/or other elements described herein. Additionally, the operating environment can provide computing resources that include, without limitation, data storage resources, data processing resources, such as virtual machine (VM) instances, networking resources, data communication resources, network services, and other types of resources.

Each type of computing resource provided by the service provider network 602 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 602 can also be configured to provide other types of computing resources not mentioned specifically herein.

The computing resources provided by the service provider network 602 may be enabled in one embodiment by one or more data centers 604A-604N (which might be referred to herein singularly as "a data center 604" or in the plural as "the data centers 604"). The data centers 604 are facilities utilized to house and operate computer systems and associated components. The data centers 604 typically include redundant and backup power, communications, cooling, and security systems. The data centers 604 can also be located in geographically disparate locations. One illustrative embodiment for a data center 604 that can be utilized to implement the technologies disclosed herein will be described below with regard to FIG. 7.

The data centers 604 may be configured in different arrangements depending on the service provider network 602. For example, one or more data centers 604 may be included in, or otherwise make-up, an availability zone. Further, one or more availability zones may make-up or be included in a region. Thus, the service provider network 602 may comprise one or more availability zones, one or more regions, and so forth. The regions may be based on geographic areas, such as being located within a predetermined geographic perimeter.

Users and/or owners of the service provider network 602 may access the computing resources provided by the service provider network 602 over any wired and/or wireless network(s) 606, which can be a wide area communication network ("WAN"), such as the Internet, an intranet or an Internet service provider ("ISP") network or a combination of such networks. For example, and without limitation, a computing device, e.g., a computing device associated with one or more clients 104 or the database proxy 102 can be utilized to access the service provider network 602 by way of the network(s) 606. Other elements described herein can also interact via the network(s) 606. For example, clients 104 can interact with the database proxy 102 via client connections 112 that extend through the network(s) 606, and the database proxy 102 can interact with the database 106 via database connections 114 that extend through the network(s) 606. It should be appreciated that a local-area network ("LAN"), the Internet, or any other networking topology known in the art that connects the data centers 604 to remote customers and other users can be utilized. It should also be appreciated that combinations of such networks can also be utilized.

Each of the data centers 604 may include computing devices that include software, such as applications that receive and transmit data. The data centers 604 can also include databases, data stores, or other data repositories that store and/or provide data. For example, data centers 604 can store and/or execute one or more instances of the database 106 and/or the database proxy 102. In some examples, the data centers 604 can also execute one or more clients 104, which can interact with instances of the database proxy 102 and/or the database 106 that may or may not also execute at data centers 604 of the service provider network 602.

Figure 7:
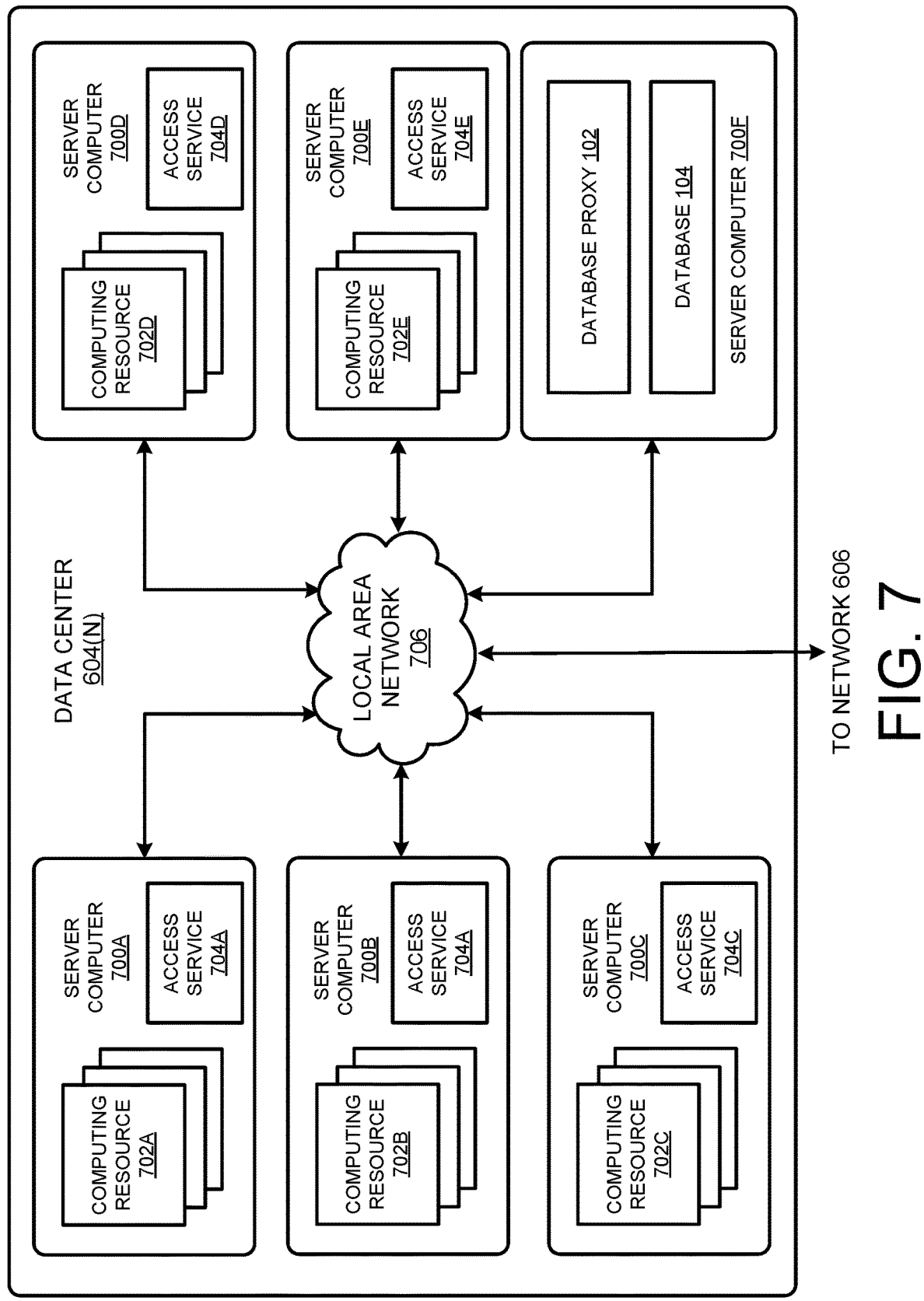
FIG. 7 is a computing system diagram that illustrates one configuration for a data center that can be utilized to implement the database proxy.

FIG. 7 is a computing system diagram that illustrates one configuration for a data center 604(N) that can be utilized to implement the database proxy 102 as described above with respect to FIGS. 1-6. The example data center 604(N) shown in FIG. 7 includes several server computers 700A-700E (collectively 700) for providing computing resources 702A-702E (collectively 702), respectively.

The server computers 700 can be standard tower, rack-mount, or blade server computers configured appropriately for providing the various computing resources (illustrated in FIG. 7 as the computing resources 702A-702E). The computing resources 702 can include, without limitation, analytics applications, data storage resources, data processing resources such as VM instances or hardware computing systems, database resources, networking resources, and others. Some of the servers 700 can also be configured to execute access services 704A-704E (collectively 704) capable of instantiating, providing and/or managing the computing resources 702, some of which are described in detail herein.

The data center 604(N) shown in FIG. 7 also includes a server computer 700F that can execute any or all of the software components described above. For example, and without limitation, the server computer 700F can be configured to execute the database proxy 102 and/or the database 106. The server computer 700F can also be configured to execute other components and/or to store data for providing some or all of the functionality described herein. In this regard, it should be appreciated that components of the systems described herein can execute on many other physical or virtual servers in the data centers 604 in various configurations. For example, the database proxy 102 and the database 106 may execute via different servers 700 of the same data center 604 or different data centers 604.

In the example data center 604(N) shown in FIG. 7, an appropriate LAN 706 is also utilized to interconnect the server computers 700A-700F. The LAN 706 is also connected to the network 606 illustrated in FIG. 6. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 604(1)-(N), between each of the server computers 700A-700F in each data center 604, and, potentially, between computing resources 702 in each of the data centers 604. It should be appreciated that the configuration of the data center 604 described with reference to FIG. 7 is merely illustrative and that other implementations can be utilized.

Figure 8:
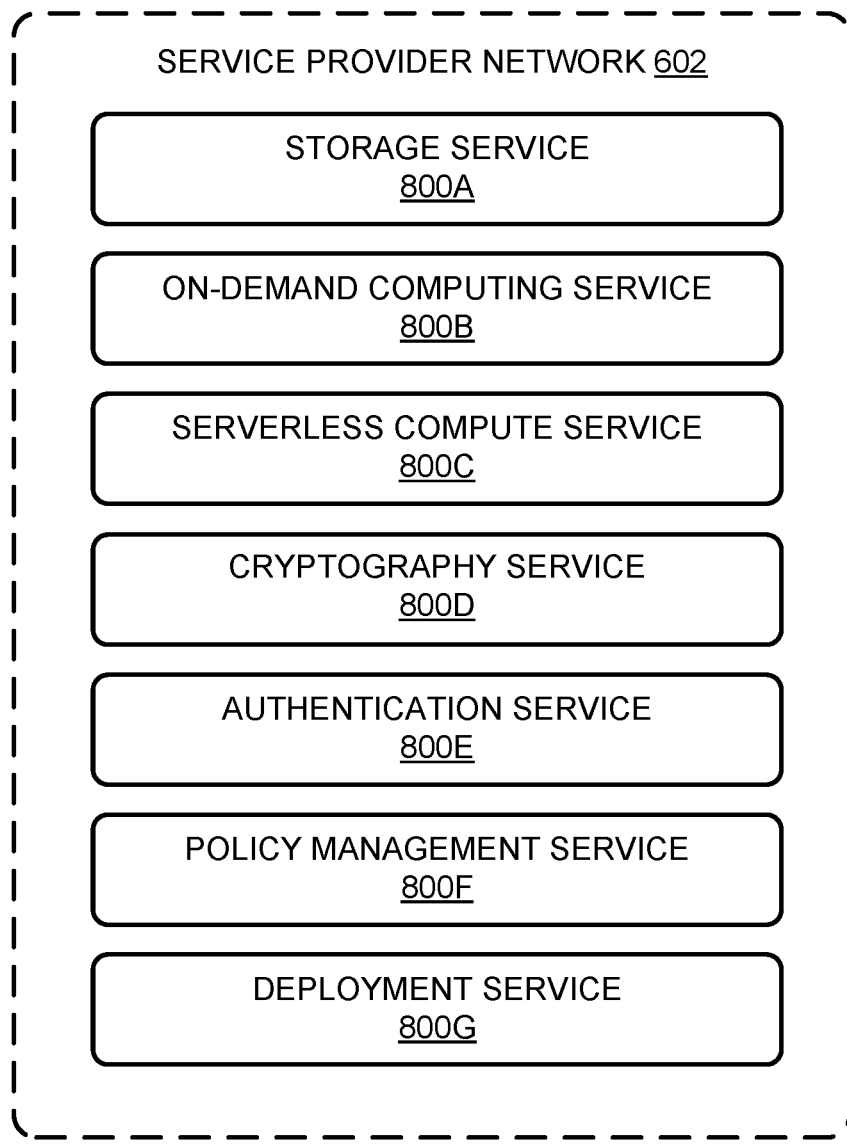
FIG. 8 is a system services diagram that shows aspects of several services that can be provided by and utilized within a service provider network.

FIG. 8 is a system services diagram that shows aspects of several services that can be provided by and utilized within the service provider network 602, which can be configured to implement the various technologies disclosed herein. The service provider network 602 can provide a variety of services to users including, but not limited to, a storage service 800A, an on-demand computing service 800B, a serverless compute service 800C, a cryptography service 800D, an authentication service 800E, a policy management service 800F, and a deployment service 800G. The service provider network 602 can also provide other types of computing services, some of which are described below.

It is also noted that not all configurations described include the services shown in FIG. 8 and that additional services can be provided in addition to, or as an alternative to, the services explicitly described herein. Each of the systems and services shown in FIG. 8 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other. Additional details regarding some of the services shown in FIG. 8 will now be provided.

The storage service 800A can be a network-based storage service that stores data obtained from users of the service provider network 602 and/or from computing resources in the service provider network 602. The data stored by the storage service 800A can be obtained from clients 104 and/or computing devices of users. The data stored by the storage service 800A may also include data associated with the database proxy 102, the database 106, and/or other elements described herein. For example, the storage service 800A may store data in one or more instances of the database 106, and/or can execute one or more instances of the database proxy 102 that clients 104 can use to access data stored in the database 106.

The on-demand computing service 800B can be a collection of computing resources configured to instantiate VM instances and to provide other types of computing resources on demand. For example, a user of the service provider network 602 can interact with the on-demand computing service 800B (via appropriately configured and authenticated API calls, for example) to provision and operate VM instances that are instantiated on physical computing devices hosted and operated by the service provider network 602. The VM instances can be used for various purposes, such as to operate as servers supporting the network services described herein, a web site, to operate business applications or, generally, to serve as computing resources for the user. In some examples, one or more clients 104 can execute via computing resources provided by the on-demand computing service 800B.

Other applications for the VM instances can be to support database applications, electronic commerce applications, business applications and/or other applications. Although the on-demand computing service 800B is shown in FIG. 8, any other computer system or computer system service can be utilized in the service provider network 602 to implement the functionality disclosed herein, such as a computer system or computer system service that does not employ virtualization and instead provisions computing resources on dedicated or shared computers/servers and/or other physical devices.

The serverless compute service 800C is a network service that allows users to execute code (which might be referred to herein as a "function") without provisioning or managing server computers in the service provider network 802. Rather, the serverless compute service 800C can automatically run code in response to the occurrence of events. The code that is executed can be stored by the storage service 800A or in another network accessible location.

In this regard, it is to be appreciated that the term "serverless compute service" as used herein is not intended to infer that servers are not utilized to execute the program code, but rather that the serverless compute service 800C enables code to be executed without requiring a user to provision or manage server computers. The serverless compute service 800C executes program code only when needed, and only utilizes the resources necessary to execute the code. In some configurations, the user or entity requesting execution of the code might be charged only for the amount of time required for each execution of their program code.

The service provider network 602 can also include a cryptography service 800D. The cryptography service 800D can utilize storage services of the service provider network 602, such as the storage service 800A, to store encryption keys in encrypted form, whereby the keys can be usable to decrypt user keys accessible only to particular devices of the cryptography service 800D. The cryptography service 800D can also provide other types of functionality not specifically mentioned herein.

The service provider network 602, in various configurations, also includes an authentication service 800E and a policy management service 800F. The authentication service 800E, in one example, is a computer system (i.e., collection of computing resources) configured to perform operations involved in authentication of users or customers. For instance, one of the services shown in FIG. 8 can provide information from a user or customer to the authentication service 800E to receive information in return that indicates whether or not the requests submitted by the user or the customer are authentic.

The policy management service 800F, in one example, is a network service configured to manage policies on behalf of users or customers of the service provider network 602. The policy management service 800F can include an interface (e.g. API or GUI) that enables customers to submit requests related to the management of a policy, such as a security policy. Such requests can, for instance, be requests to add, delete, change, or otherwise modify policy for a customer, service, or system, or for other administrative actions, such as providing an inventory of existing policies and the like.

The service provider network 602 can additionally maintain other network services based, at least in part, on the needs of its customers. For instance, the service provider network 602 can maintain a deployment service 800G for deploying program code in some configurations. The deployment service 800G provides functionality for deploying program code, such as to virtual or physical hosts provided by the on-demand computing service 800B. Other services include, but are not limited to, database services, object-level archival data storage services, and services that manage, monitor, interact with, or support other services. The service provider network 602 can also be configured with other network services not specifically mentioned herein in other configurations.

Figure 9:
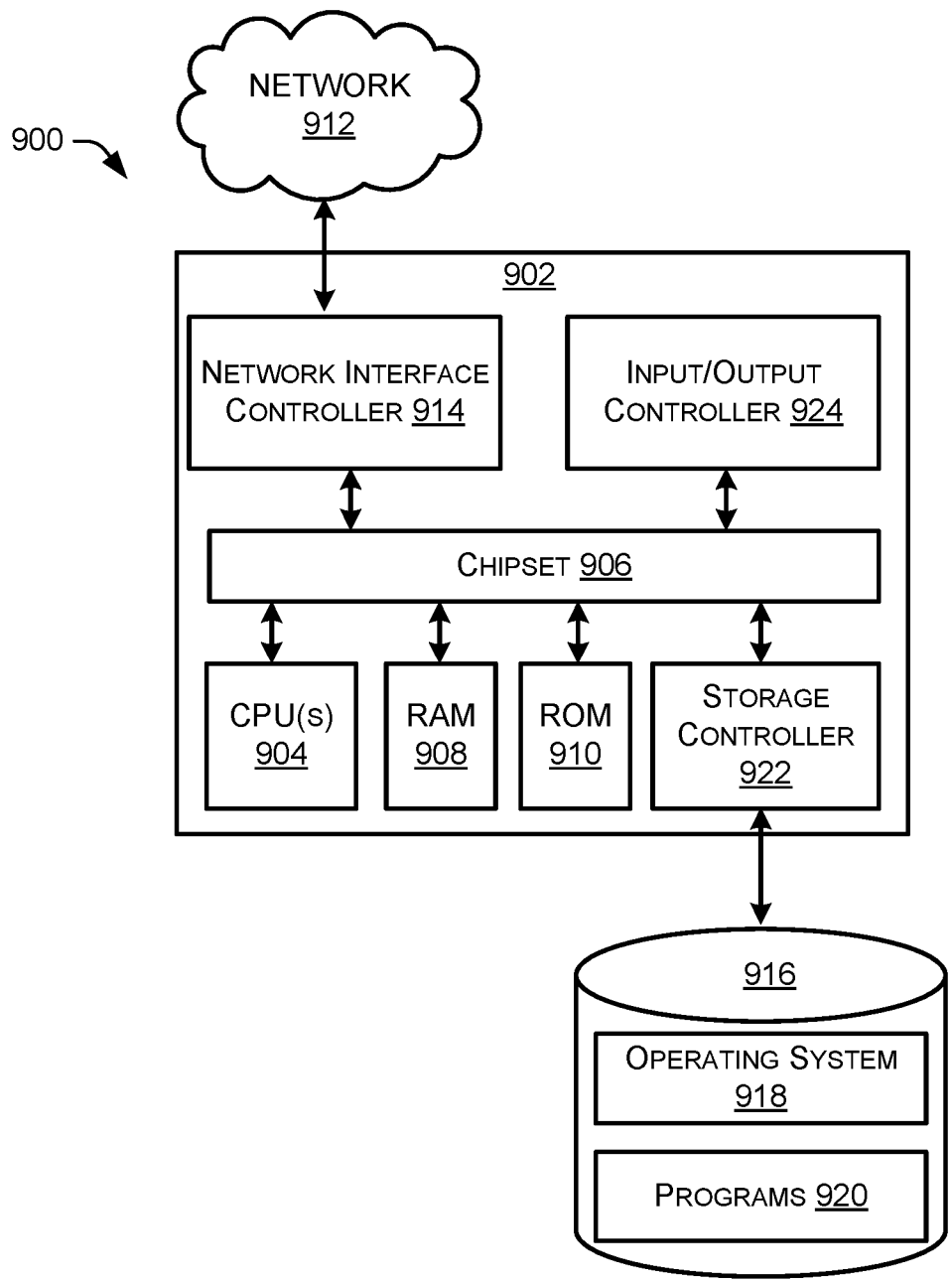
FIG. 9 shows an example computer architecture for a computer capable of executing program components for implementing functionality described herein.

FIG. 9 shows an example computer architecture for a computer 900 capable of executing program components for implementing functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein. For instance, in some examples, the computer 900 may be associated with the database proxy 102, one or more clients 104, or the database 106.

The computer 900 includes a baseboard 902, or "motherboard," which may be one or more printed circuit boards to which a multitude of components and/or devices may be connected by way of a system bus and/or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 912. The chipset 906 can include functionality for providing network connectivity through a NIC 914, such as a gigabit Ethernet adapter. The NIC 914 is capable of connecting the computer 900 to other computing devices over the network 912. It should be appreciated that multiple NICs 914 can be present in the computer 900, connecting the computer to other types of networks and remote computer systems.

The computer 900 can be connected to a mass storage device 916 that provides non-volatile storage for the computer. The mass storage device 916 can store an operating system 918, programs 920, and data, which have been described in greater detail herein. The mass storage device 916 can be connected to the computer 900 through a storage controller 922 connected to the chipset 906. The mass storage device 916 can consist of one or more physical storage units. The storage controller 922 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the mass storage device 916 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 916 is characterized as primary or secondary storage, and the like.

For example, the computer 900 can store information to the mass storage device 916 by issuing instructions through the storage controller 922 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the mass storage device 916 by detecting the physical states or characteristics of one or more particular locations within the physical storage units.

In addition to the mass storage device 916 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned above, the mass storage device 916 can store an operating system 918 utilized to control the operation of the computer 900. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 916 can store other system or application programs and data utilized by the computer 900.

In one configuration, the mass storage device 916 or other computer-readable storage media is encoded with computer-executable instructions which, when loaded into the computer 900, transform the computer from a general-purpose computing system into a special-purpose computer capable of implementing the configurations described herein. These computer-executable instructions transform the computer 900 by specifying how the CPUs 904 transition between states, as described above. According to one configuration, the computer 900 has access to computer-readable storage media storing computer-executable instructions which, when executed by the computer 900, perform the various processes described above. The computer 900 can also include computer-readable storage media for performing any of the other computer-implemented operations described herein.

The computer 900 can also include one or more input/output controllers 924 for receiving and processing input from a number of input devices, such as a keyboard, a mouse, a touchpad, a touch screen, an electronic stylus, or other type of input device. Similarly, an input/output controller 924 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or can utilize an architecture completely different than that shown in FIG. 9.

Based on the foregoing, it should be appreciated that technologies for multiplexing database connections 114 by the database proxy 102 in association with prepared statements have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A method comprising:
receiving, by a database proxy, and from a client via a client connection, a parse message defining a prepared statement (PS) in association with a first database transaction;
selecting, by the database proxy in association with the first database transaction, a first database connection from a pool of database connections between the database proxy and a database;
forwarding, by the database proxy in association with the first database transaction, the parse message to the database via the first database connection, wherein the parse message causes the database to set up the PS in association with the first database connection;
storing, by the database proxy, PS setup data in state data associated with the client connection, wherein the PS setup data is based on the parse message;
receiving, by the database proxy, and from the client via the client connection, a bind message that references the PS in association with a second database transaction;
selecting, by the database proxy in association with the second database transaction, a second database connection from the pool of database connections;
sending, by the database proxy in association with the second database transaction, an injected parse message to the database via the second database connection based on the PS setup data, wherein the injected parse message causes the database to set up the PS in association with the second database connection; and
forwarding, by the database proxy in association with the second database transaction, the bind message to the database via the second database connection.

2. The method of claim 1, further comprising:
adding, by the database proxy, the injected parse message and the bind message to a pending message queue in the state data, in response to sending the injected parse message and forwarding the bind message via the second database connection;
receiving, by the database proxy via the second database connection, a first response from the database indicating that the database successfully processed the injected parse message and set up the PS in association with the second database connection;
removing, by the database proxy, the injected parse message from the pending message queue based on the first response;
refraining, by the database proxy, from forwarding the first response associated with the injected parse message to the client via the client connection;
receiving, by the database proxy via the second database connection, a second response from the database indicating that the database successfully processed the bind message in association with the PS and the second database connection;
removing, by the database proxy, the bind message from the pending message queue based on the second response; and
forwarding, by the database proxy, the second response associated with the bind message to the client via the client connection.

3. The method of claim 1, further comprising:
receiving, by the database proxy, and from the client via the client connection, a second parse message defining a second PS;
forwarding, by the database proxy, the second parse message to the database via the first database connection;
storing, by the database proxy, second PS setup data in the state data, wherein the second PS setup data is based on the second parse message;

receiving, by the database proxy, an error response associated with the second parse message from the database; and rolling back, by the database proxy in response to receiving the error response, the state data by deleting the second PS setup data.

4. The method of claim 1, wherein the PS setup data comprises at least one of:

a name of the PS indicated by the parse message, a query string of the PS indicated by the parse message, or data types associated with variable placeholders in the query string of the PS indicated by the parse message.

5. A method comprising:

receiving, by a database proxy, and from a client via a client connection, a block of prepared statement (PS) setup messages that set up a PS;

forwarding, by the database proxy, the block of PS setup messages to a database via a first database connection, wherein the block of PS setup messages causes the database to set up the PS in association with the first database connection;

storing, by the database proxy, PS setup data in state data associated with the client connection, wherein the PS setup data is based at least in part on the block of PS setup messages;

receiving, by the database proxy, and from the client via the client connection, a block of PS invocation messages that reference the PS; and forwarding, by the database proxy, the block of PS invocation messages to the database via a second database connection based at least in part on the PS setup data, wherein the database associates the second database connection with the PS.

6. The method of claim 5, further comprising selecting, by the database proxy, the second database connection from a pool of database connections based at least in part on the state data, wherein the state data indicates that the database associates the second database connection with the PS or a second PS that is compatible with the PS.

7. The method of claim 6, wherein the PS and the second PS have an identical query string with matching variable placeholders.

8. The method of claim 5, further comprising:

selecting, by the database proxy, the second database connection from a pool of database connections; and sending, by the database proxy, one or more injected PS setup messages to the database via the second database connection based at least in part on the PS setup data, wherein the one or more injected PS setup messages cause the database to set up the PS in association with the second database connection, wherein the database proxy forwards the block of PS invocation messages to the database via the second database connection in a block of messages that includes the one or more injected PS setup messages ahead of the block of PS invocation messages.

9. The method of claim 8, further comprising:

adding, by the database proxy, the one or more injected PS setup messages and the PS invocation messages to a pending message queue in the state data;

receiving, by the database proxy via the second database connection, one or more first responses from the database indicating that the database successfully processed the one or more injected PS setup messages;

removing, by the database proxy, the one or more injected PS setup messages from the pending message queue based at least in part on the one or more first responses;

refraining, by the database proxy, from forwarding the one or more first responses to the client via the client connection;

receiving, by the database proxy via the second database connection, one or more second responses from the database indicating that the database successfully processed the PS invocation messages;

removing, by the database proxy, the PS invocation messages from the pending message queue based at least in part on the one or more second responses; and forwarding, by the database proxy, the one or more second responses to the client via the client connection.

10. The method of claim 5, further comprising:

receiving, by the database proxy, and from the client via the client connection, a second block of PS setup messages that set up a second PS;

forwarding, by the database proxy, the second block of PS messages to the database via the first database connection;

storing, by the database proxy, second PS setup data in the state data, wherein the second PS setup data is based at least in part on the second block of PS setup messages;

receiving, by the database proxy, an error response associated with the second block of PS setup messages from the database; and rolling back, by the database proxy based at least in part on the error response, the state data at least in part by deleting the second PS setup data.

11. The method of claim 5, wherein:

the block of PS setup messages comprises a parse message that defines at least one of a name of the PS, a query string of the PS, or one or more variable placeholders in the query string, and the PS setup data indicates at least one of the name of the PS, the query string of the PS, or the one or more variable placeholders in the query string.

12. The method of claim 11, wherein the block of PS invocation messages comprises:

a bind message that readies the PS for execution by providing values for the one or more variable placeholders, and an execute message that instructs the database to execute the PS based at least in part on the bind message.

13. The method of claim 5, wherein the block of PS setup messages is associated with a first database transaction and the block of PS invocation setup messages is associated with a second database transaction.

14. The method of claim 5, further comprising:

receiving, by the database proxy, and from the client via the client connection, a second block of PS invocation messages that reference the PS;

determining, by the database proxy, that a size of the state data associated with prepared statements exceeds a pin connection threshold;

pinning, by the database proxy, the client connection to a pinned database connection based at least in part on the size of the state data associated with prepared statements exceeding the pin connection threshold;

forwarding, by the database proxy, the second block of PS invocation messages to the database via the pinned database connection; and clearing, by the database proxy, the state data associated with the client connection.

15. The method of claim 14, wherein pinning the client connection to the pinned database connection comprises sending, by the database proxy, one or more injected PS setup messages to the database via the pinned database connection based at least in part on the PS setup data, wherein the one or more injected PS setup messages cause the database to set up the PS in association with the pinned database connection.

16. One or more non-transitory computer-readable media storing computer-executable instructions associated with a database proxy that, when executed by one or more processors, cause the one or more processors to perform operations comprising:
- receiving, from a client via a client connection, a block of prepared statement (PS) setup messages that set up a PS;
- forwarding the block of PS setup messages to a database via a first database connection, wherein the block of PS setup messages causes the database to set up the PS in association with the first database connection;
- storing PS setup data in state data associated with the client connection, wherein the PS setup data is based at least in part on the block of PS setup messages;
- receiving, from the client via the client connection, a block of PS invocation messages that reference the PS; and
- forwarding, the block of PS invocation messages to the database via a second database connection based at least in part on the PS setup data, wherein the database associates the second database connection with the PS.

17. The one or more non-transitory computer-readable media of claim 16, wherein the operations further comprise selecting the second database connection from a pool of database connections based at least in part on the state data, wherein the state data indicates that the database associates the second database connection with the PS or a second PS that is compatible with the PS.

18. The one or more non-transitory computer-readable media of claim 16, wherein:
- the operations further comprise:
  - selecting the second database connection from a pool of database connections; and
  - sending one or more injected PS setup messages to the database via the second database connection based at least in part on the PS setup data,
- the one or more injected PS setup messages cause the database to set up the PS in association with the second database connection, and
- the database proxy forwards the block of PS invocation messages to the database via the second database connection in a block of messages that includes the one or more injected PS setup messages ahead of the block of PS invocation messages.

19. The one or more non-transitory computer-readable media of claim 18, wherein the operations further comprise:
- adding the one or more injected PS setup messages and the PS invocation messages to a pending message queue in the state data;
- receiving, via the second database connection, one or more first responses from the database indicating that the database successfully processed the one or more injected PS setup messages;
- removing the one or more injected PS setup messages from the pending message queue based at least in part on the one or more first responses;
- refraining from forwarding the one or more first responses to the client via the client connection;
- receiving, via the second database connection, one or more second responses from the database indicating that the database successfully processed the PS invocation messages;
- removing the PS invocation messages from the pending message queue based at least in part on the one or more second responses; and
- forwarding the one or more second responses to the client via the client connection.

20. The one or more non-transitory computer-readable media of claim 16, wherein the operations further comprise:
- receiving, from the client via the client connection, a second block of PS invocation messages that reference the PS;
- determining that a size of the state data associated with prepared statements exceeds a pin connection threshold;
- pinning the client connection to a pinned database connection based at least in part on the size of the state data associated with prepared statements exceeding the pin connection threshold;
- forwarding the second block of PS invocation messages to the database via the pinned database connection; and
- clearing the state data associated with the client connection.

* * * * *